(12) United States Patent
Masuda et al.

(10) Patent No.: US 8,141,306 B2
(45) Date of Patent: Mar. 27, 2012

(54) SOLAR BATTERY MODULE DEVICE AND METHOD OF INSTALLING THE SAME

(75) Inventors: Hiroto Masuda, Higashiohmi (JP);
Futoshi Takahashi, Higashiohmi (JP);
Toshiaki Ohno, Higashiohmi (JP)

(73) Assignee: Kyocera Corporation, Kyoto (JP)

( * ) Notice: Subject to any disclaimer, the term of this patent is extended or adjusted under 35 U.S.C. 154(b) by 753 days.

(21) Appl. No.: 11/577,657

(22) PCT Filed: Oct. 21, 2005

(86) PCT No.: PCT/JP2005/019381
§ 371 (c)(1),
(2), (4) Date: May 15, 2008

(87) PCT Pub. No.: WO2006/043658
PCT Pub. Date: Apr. 27, 2006

(65) Prior Publication Data
US 2008/0264470 A1 Oct. 30, 2008

(30) Foreign Application Priority Data

| Oct. 22, 2004 | (JP) | 2004-308944 |
| Oct. 22, 2004 | (JP) | 2004-308945 |
| Oct. 22, 2004 | (JP) | 2004-308946 |
| Mar. 28, 2005 | (JP) | 2005-092181 |
| Mar. 29, 2005 | (JP) | 2005-095392 |

(51) Int. Cl.
*E04D 13/18* (2006.01)

(52) U.S. Cl. ........... 52/173.3; 52/586.1; 52/656.1; 136/244; 126/621; 126/623

(58) Field of Classification Search ............. 52/20, 222, 52/173.3, 251, 586.1, 586.2, 582.1, 656.1, 52/665, 726.2; 136/244, 251, 291; 126/623, 126/704, 621, 622; 257/433
See application file for complete search history.

(56) References Cited

U.S. PATENT DOCUMENTS 5,280,133 A * 1/1994 Nath .............................. 174/373
(Continued)

FOREIGN PATENT DOCUMENTS

JP 50-016319 2/1975
(Continued)

OTHER PUBLICATIONS

Japanese language office action and its English language translation for corresponding Japanese application 2005146151 lists the reference above.

(Continued)

*Primary Examiner* — William Gilbert
(74) *Attorney, Agent, or Firm* — DLA Piper LLP (US)

(57) ABSTRACT

A solar battery module device (14), wherein an bottom-side end part (22) is fixed onto a placing surface (23) by fitting the top-side end part (19) as one-side of a rectangular shape of a rectangular flat plate-like solar battery module (16) to the engagement part (20) of an upper frame (21) forming a frame (17) from the lower side of a roofer and by fitting a fixing cover (27) to a lower frame (24) in a state in which the bottom-side end part (22) as the opposite-side of the rectangular shape of the solar battery module (16) is placed on the placing surface (23) of the lower frame (24) forming the frame (17). According to the solar battery module device of the present invention, operations such as installation work and maintenance and inspections for the device can be easily and safely performed without damaging the solar battery module (16).

9 Claims, 26 Drawing Sheets

U.S. PATENT DOCUMENTS

| | | | | |
|---|---|---|---|---|
| 5,509,973 | A | * | 4/1996 | Ishikawa et al. ............... 136/251 |
| 6,105,317 | A | * | 8/2000 | Tomiuchi et al. ............. 52/173.3 |
| 6,370,828 | B1 | * | 4/2002 | Genschorek .................... 52/200 |
| 6,959,517 | B2 | * | 11/2005 | Poddany et al. ............. 52/173.3 |

FOREIGN PATENT DOCUMENTS

| | | |
|---|---|---|
| JP | 10-046772 | 2/1998 |
| JP | 10-317602 | 12/1998 |
| JP | 2000-199302 | 7/2000 |
| JP | 2000-226908 | 8/2000 |
| JP | 2000226910 A | 8/2000 |
| JP | 2000-336874 | 12/2000 |
| JP | 2000-352154 | 12/2000 |
| JP | 2000-354154 | 12/2000 |
| JP | 2001081920 A | 3/2001 |
| JP | 2001-090264 | 4/2001 |
| JP | 2001-193245 | 7/2001 |
| JP | 2001-230440 | 8/2001 |
| JP | 2001-311270 | 11/2001 |
| JP | 2002-021276 | 1/2002 |
| JP | 2002021276 A | 1/2002 |
| JP | 2002194866 A | 7/2002 |
| JP | 2002-252364 | 9/2002 |
| JP | 2003003612 A | 1/2003 |
| JP | 2003-184245 | 7/2003 |
| JP | 2003-347576 | 12/2003 |
| JP | 2004-027734 | 1/2004 |
| JP | 2004-036240 | 2/2004 |
| JP | 2004036240 A | 2/2004 |
| JP | 2004235378 A | 8/2004 |
| JP | 2004-260016 | 9/2004 |
| WO | WO 02/41407 A1 | 5/2002 |

OTHER PUBLICATIONS

Japanese language office action dated Jan. 25, 2011 and its English language translation for corresponding Japanese application 2005343624 lists the references above.

Japanese language office action dated Aug. 23, 2011 and its English language translation for corresponding Japanese application 2005343624.

Extended European search report dated May 3, 2011 and its English language translation for corresponding European application 0579525.4 cites the foreign patent documents above.

* cited by examiner

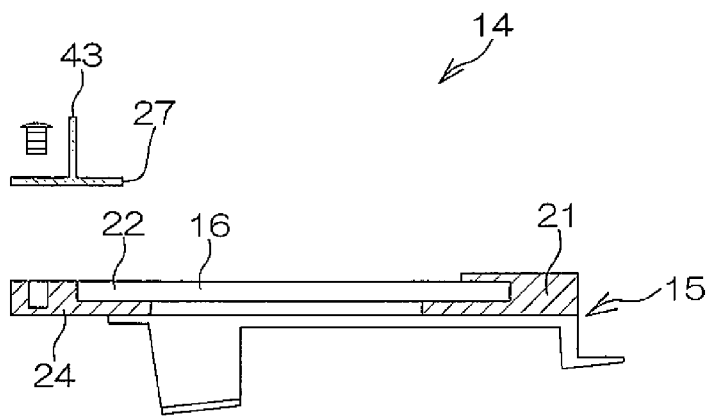
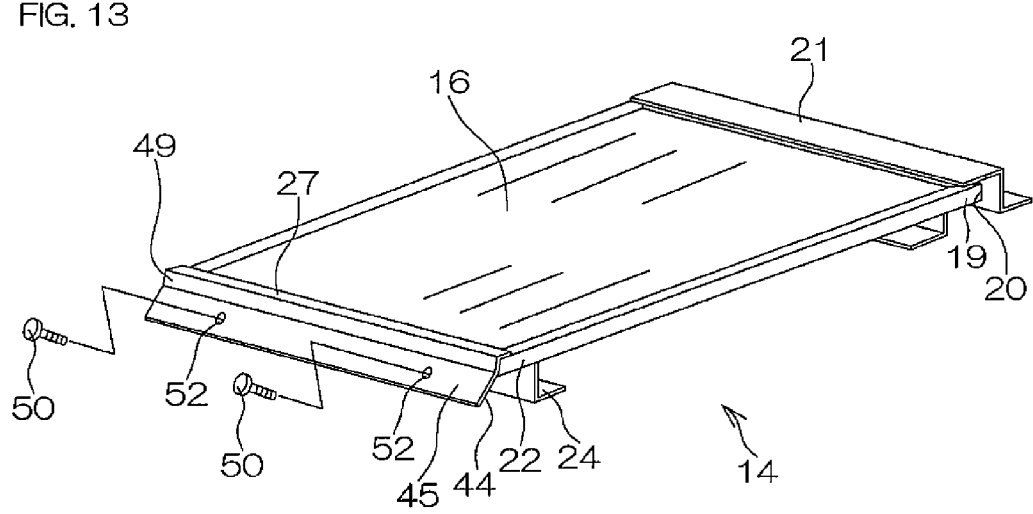

SOLAR BATTERY MODULE DEVICE AND METHOD OF INSTALLING THE SAME

TECHNICAL FIELD

The present invention relates to a solar battery module device for installing a solar battery module on a roof that generates power utilizing solar energy and a method of installing the same.

RELATED ART

By recent rise in environmental consciousness, photovoltaic power generating systems for generating power by installing solar battery modules on roofs of general housings and public buildings have been attracting attention to as clean energy. Example of a photovoltaic power generating system installed on an sloping roof of a general housing or the like include a roof-placement type system for installing a mount on the existing roof and mounting a solar battery module thereon and a roof-integration type system in which a roof is thatched with a roofing material such as a roof tile or a slate having a solar battery incorporated therein in place of or together with a normal roofing material.

The latter photovoltaic power generating system of a roof-integration type can be constructed when a general housing is newly built or renovated and has the advantage in that an appearance harmonized with a roof is more beautiful than that in the roof-placement type system. FIG. 53 is a perspective view showing a state where a conventional roof-integration type photovoltaic power generating system 1 is installed on a roof 3 of a general housing 2, FIG. 54 is a cross-sectional view showing a state where a roofer 7 of a roof is thatched with roofing materials 5 serving as solar battery modules having solar batteries 4 incorporated therein that constitutes the photovoltaic power generating system 1 and normal roofing materials 6, and FIGS. 55 and 56 are perspective views each showing an example of the shapes of the roofing materials 5 and 6 constituting the photovoltaic power generating system 1.

Referring to the figures, used as the rooting material 5 constituting the roof-integration type photovoltaic power generating system 1 is one each having the solar battery 4 incorporated into a main body 8 having substantially the same shape as that of the normal roofing material 6. Referring to FIG. 55, for example, the roofing materials 5 as illustrated are each formed in a rectangular flat plate shape and have the same shape as the roofing materials 6 having a configuration in which the adjacent ones in a direction parallel to a ridge of the roof are meshed with and connected to each other by an upper protruding part 9 projected downward and a lower protruding part 10 projected upward. The roofing materials are also each formed by forming the main body 8 having a recess part 11 formed on its upper surface (light receiving surface) of ceramic or the like, similarly to the roofing materials 6, and embedding the solar battery 4 formed by affixing a translucent substrate composed of a translucent body such as glass or resin and a solar battery cell, for example, in the recess part 11 of the main body 8 to integrate with adhesives, for example.

Referring to FIG. 56, the roofing materials 5 as illustrated have the same shape as the roofing materials 6 in a Japanese style formed in a curved shape, and are each formed by forming a main body 8 having a recess part 11 on its upper surface (light receiving surface) of ceramic or the like, similarly to the above-mentioned roofing materials 6, and embedding the solar battery 4 in the recess part 11 of the main body 8 to integrate with adhesives, for example.

Since both the roofing materials 5 are entirely the same in shape as the normal roofing material 6 having no solar battery, the installation thereof on the roof can be performed in the same manner as that in construction of the normal roofing material 6. That is, referring to FIG. 54, the roof can be thatched with the roofing materials 5 and 6 while overlapping them in order from an edge of eaves to a ridge of the roof with crosspieces 12 equally spaced on the roofer 7 used as a reference.

In the example shown in FIG. 55, for example, the roofing materials 5 and 6 are first successively installed rightward along the right side of the roofing materials 5 and 6 installed at left front in the figure while meshing the upper protruding part 9 and the lower protruding part 10 with each other with the first crosspiece from the edge of eaves used as a reference. Then, on the roofing materials 5 and 6 installed in one line, the roofing materials 5 and 6 in the subsequent line are similarly installed while being connected thereto such that ends closer to the edge of eaves of the roofing materials 5 and 6 to be newly installed are respectively overlapped with ends closer to the ridge of the roofing materials 5 and 6 previously installed with the second crosspiece from the edge of eaves used as a reference. This operation is repeated up to the ridge of the roof, so that the roof can be thatched with the roofing materials 5 and 6 while overlapping them with one another in order from the edge of eaves to the ridge of the roof.

In the example shown in FIG. 56, the roofing materials 5 and 6 are first successively installed along the right side of the roofing materials 5 and 6 installed at left front in the figure with the first crosspiece from the edge of eaves used as a reference such that left ends of the roofing materials 5 and 6 to be newly installed are respectively overlapped with right ends of the roofing materials 5 and 6 previously installed. Then, on the roofing materials 5 and 6 installed in one line, the roofing materials 5 and 6 in the subsequent line are similarly installed while being overlapped therewith such that ends closer to the edge of eaves of the roofing materials 5 and 6 to be newly installed are respectively overlapped with ends closer to the ridge of the roofing materials 5 and 6 previously installed with the second crosspiece from the edge of eaves used as a reference. This operation is repeated up to the ridge of the roof, so that the roof can be thatched with the roofing materials 5 and 6 while overlapping with one another in order from the edge of eaves to the ridge of the roof.

In the conventional roofing material 5, however, the recess part 11 for which the solar battery 4 is embedded in and a through hole (not shown), for example, penetrating to a reverse surface of the main body 8 from the recess part 11 for passing an output wiring 13 connected to the solar battery 4 must be formed. Therefore, the shape of the main body 8 becomes complicated, so that there lies a problem that producing the main body is not easy. The strength and the durability of the main body 8 having the complicated shape must be ensured. Therefore, the size of the recess part 11 is restricted. Correspondingly, the area of the solar battery 4 to be embedded into the recess part 11 is restricted, so that electricity generated per unit area by the roofing material 5 cannot be increased.

Referring to FIG. 54, the output wiring 13 is generally passed through a clearance, produced by overlapping of the roofing materials 5 and 6, between the roofing materials and the roofer 7. Every time the one roofing material 5 is installed, wiring operations for connecting the output wiring 13 to a bus line (not shown) must be performed. Accordingly, at the time when the installation of all the roofing materials 5 is completed, operations for wiring to the solar battery 4 incorporated in each of the roofing materials 5 must be also completed. Therefore, there also lies a problem that installation work is complicated because it involves a large number of man-hours, so that misconnection may happen.

Japanese Unexamined Patent Publication No. 2003-347576 A describes a solar battery module device in which a solar battery module having a rectangular flat plate shape and having a shape and a size substantially equal to those corresponding to one conventional roofing material or a plurality of (two or more) conventional roofing materials, which is formed by holding a solar battery having a translucent body such as glass or resin and a solar battery cell affixed to each other in a frame made of a metal such as an aluminum alloy is held in a casing formed by assembling a frame made of a metal such as an aluminum alloy or stainless steel. In the invention described in Japanese Unexamined Patent Publication No. 2003-347576 A, a main body having a complicated shape and difficulty in production is useless, and the casing can be formed by only assembling the metal frame. Therefore, it is possible to improve the productivity of the solar battery module device and to reduce the manufacturing cost thereof.

Since the size of the solar battery module is not restricted by the main body, electricity generated per unit area by the solar battery module device can be also increased. Further, when the solar battery module device is combined with the conventional roofing material, the metal frame forming the casing may be one corresponding to a connection structure with the roofing material to be combined. Only by replacing the frame, the roof can be thatched with the solar battery module device together with roofing materials having various shapes.

DISCLOSURE OF INVENTION

However, the solar battery module devices described above must be installed on a roofer while being overlapped with each other in order from an edge of eaves to a ridge of a roof, similarly to conventional roofing materials incorporating solar batteries therein. Every time one solar battery module device is installed, operations for wiring to a solar battery module must be performed as in the conventional example. Therefore, installation work is complicated because it involves a large number of man-hours. Thus, the problem that misconnection may happen is not still solved.

When misconnection is found during installation or in a test after installation, for example, the roofing materials and the solar battery module devices must be successively removed from the ridge in order, so that there lies a problem that large-scale operations for reconnection are required. When a failure or the like is found in maintenance and inspection operations of a photovoltaic power generating system, the roofing materials and the solar battery module devices must be also similarly removed in order from the ridge. Therefore, there lies a problem that large-scale operations are required for replacing and repairing the failed solar battery module device.

Furthermore, in the case of the installation work, a worker necessarily gets on the previously installed solar battery module device closer to the edge of eaves in order to install the roofing material and the solar battery module device closer to the ridge to perform operations. However, a surface of the solar battery module is covered with glass or the like and is slippery, as previously described, so that there lies a problem that the operations cannot be performed safely. Further, the solar battery module may be damaged by the worker getting thereon.

An object of the present invention is to provide a solar battery module device capable of performing installation work and maintenance and inspection operations more simply and safely than before without damaging a solar battery module, and a method of installing the same.

In order to attain the above-mentioned object, a solar battery module device according to the present invention comprises a rectangular flat plate-shaped solar battery module and an installing member for installing the solar battery module on a sloping roof, the installing member comprises an upper frame disposed on the roof and having an engagement part in which a top-side end part serving as one side of a rectangular shape of the solar battery module is fitted from the lower side in the sloping direction of the roof, a lower frame disposed below the upper frame in the sloping direction of the roof and having a placing surface on which a bottom-side end part serving as the opposite side of the rectangular shape of the solar battery module is placed with the top-side end part of the solar battery module fitted in the engagement part of the upper frame, and a fixing cover detachably mounted on the lower frame for fixing the bottom-side end part on the placing surface.

In the solar battery module device according to the present invention, it is preferable that the lower frame has a flat plate-shaped extended part extended in a slopingly downward direction of a surface of the solar battery module to be mounted on the lower side in the sloping direction of the roof, and the fixing cover has a flat plate-shaped mounting part overlapped with the extended part and mounted thereon, and a fixing part abutted against an end surface and an upper surface of the bottom-side end part of the solar battery module for fixing the bottom-side end part to the lower frame with the mounting part mounted on the extended part. It is preferable that a projection abutted against the end surface of the bottom-side end part of the solar battery module is formed on the fixing part. Further, it is preferable that the projection has a slant with the end surface of the bottom-side end part of the solar battery module.

It is preferable that a projection abutted against an end surface of the top-side end part fitted in the engagement part of the upper frame of the solar battery module is formed on the engagement part, and it is preferable that the projection has a slant with the end surface of the top-side end part of the solar battery module. Further, it is preferable that a projection for snow stop is formed on an upper surface of the fixing cover.

It is preferable that the engagement part of the upper frame has a supporting part abutted against a lower surface of the top-side end part of the solar battery module for supporting the end part from below, a pressing part located above the supporting part in the sloping direction of the roof and abutted against the upper surface of the end part supported from below by the supporting part, and a groove part located at a position above the supporting part in the sloping direction of the roof and opposite to the pressing part and recessed toward the roof compared with the supporting part. Further, it is preferable that an elastic member is used to stop water between the solar battery module and the upper frame.

It is preferable that at least one of the top-side end part and the bottom-side end part of the solar battery module is mounted on at least one of the upper frame and the lower frame through a conductive fitting integrally formed of a plate material having a plate-shaped upper surface part abutted against the upper surface of the end part, a plate-shaped lower surface part abutted against the lower surface of the end part, claw parts respectively extending upward and downward in the thickness direction of a plate from both the parts, and a connecting part for connecting the upper surface part and the lower surface part. Further, it is preferable that the connecting part is a cushioning part elastically deformable.

It is preferable that the installing member comprises right and left side frames for respectively holding the right and left sides of the rectangular shape of the solar battery module, both the side frames are respectively formed in such shapes that when a plurality of installing members are arranged in a direction perpendicular to the sloping direction of the roof, the right side frame in the left installing member and the left side frame in the right installing member are overlapped with each other, and the installing members are respectively provided with protruding parts that are overlapped with and conductively connected to each other when they arranged in the direction perpendicular to the sloping direction of the roof with both the side frames overlapped with each other.

A method of installing the solar battery module device according to the present invention is a method of installing a solar battery module device on a sloping roof in which an engagement part of an upper frame has a supporting part abutted against a lower surface of a top-side end part of a solar battery module for supporting the end part from below, a pressing part located above the supporting part in the sloping direction of the roof and abutted against an upper surface of the end part supported from below by the supporting part, and a groove part located at a position above the supporting part in the sloping direction of the roof and opposite to the pressing part and recessed toward the roof compared with the supporting part, as previously described, the method preferably comprises the steps of:

(a) fixing an installing member on the roof;

(b) inserting the top-side end part of the solar battery module into the groove part of the engagement part of the upper frame in the fixed installing member through an opening between the supporting part and the pressing part;

(c) rotating the bottom-side end part of the solar battery module downward with the vicinity of the top-side end part used as its support for placing the bottom-side end part on a placing surface of the lower frame, and supporting the top-side end part from below by the supporting part as well as abutting the pressing part against an upper surface of the end part; and (d) mounting a fixing cover on the lower frame to fix the bottom-side end part of the solar battery module. It is preferable that the installing method according to the present invention comprises the step of inserting an elastic member into an area between the solar battery module and the upper frame.

Effect of the Invention

In the solar battery module device according to the present invention, the solar battery module can be mounted on the installing member and installed on the sloping roof by fixing the installing member on the roof, then fitting the top-side end part serving as one side of the rectangular shape of the solar battery module from the lower side in the sloping direction of the roof in the engagement part of the upper frame in the installing member, and then mounting the fixing cover on the lower frame with the bottom-side end part serving as the opposite side of the rectangular shape of the solar battery module placed on the placing surface of the lower frame to fix the bottom-side end part on the placing surface. Therefore, a plurality of installing members corresponding to a required number of solar battery module devices, for example, are previously fixed on the roof. The solar battery module can be individually mounted on the installing member at an arbitrary position at an arbitrary time.

Therefore, it is possible to mount the solar battery modules on the installing members in order from the ridge to the edge of eaves of the sloping roof, for example, which was impossible in the conventional solar battery module device installed in the same manner as the normal roofing material. The chances that a worker must get on the solar battery module can be significantly reduced to improve the safety of installation operations and prevent the solar battery module from damage by suitably setting the order in which the solar battery modules are mounted in conformity with the shape or the like of the roof.

Furthermore, the solar battery module at the arbitrary position can be individually removed from the installing member in a procedure opposite to the foregoing procedure without removing the other solar battery modules. Therefore, operations in a case where misconnection is found in a test during or after installation, for example, or a case where a failure or the like is found at the time of maintenance and inspection operations of the photovoltaic power generating system can be also significantly simplified.

When the lower frame in the installing member has the flat plate-shaped extended part extended in a slopingly downward direction of the surface of the solar battery module to be mounted on the lower side in the sloping direction of the roof, and the fixing cover has the flat plate-shaped mounting part overlapped with the extended part and mounted thereon and the fixing part abutted against the end surface and the upper surface of the bottom-side end part of the solar battery module for fixing the bottom-side end part to the lower frame with the mounting part mounted on the extended part, the solar battery module can be mounted on the installing member more reliably without producing backlash or the like.

That is, when the mounting part of the fixing cover is mounted on the extended part extended in a slopingly downward direction of the surface of the solar battery module of the lower frame with the fixing part of the fixing cover abutted against the end surface and the upper surface of the bottom-side end part of the solar battery module, a fixing force directed downward in the thickness direction, i.e., toward the placing surface of the lower frame can be applied to the bottom-side end part of the solar battery module from the upper surface thereof, and a fixing force directed toward the upper side in the sloping direction of the roof, i.e., toward the upper frame can be also applied to the end part from the end surface thereof.

Therefore, the solar battery module mounted on the installing member can be prevented from backlash of the solar battery module and more reliably mounted, for example. The deterioration of the solar battery module due to the occurrence of corrosion, for example, can be reliably prevented by preventing a protective film such as an alumite layer, a plating layer, or a clear coat layer for covering a surface of a frame formed of an aluminum alloy or the like, of the solar battery module from damage and chipping and thinning due to backlash of the solar battery module against the installing member, for example.

By extending the extended part slopingly downward from the surface of the solar battery module to reduce the length thereof in the sloping direction of the roof, the ratio of the length of the lower frame to the length in the same direction of the whole solar battery module device can be reduced. Therefore, the power generation efficiency can be also improved by reducing the loss of the power generation area per unit area of the photovoltaic power generating system.

In a case where a projection is formed in the fixing part of the fixing cover, the tip of the projection can be stuck in the frame by pressing the tip against the end surface of the bottom-side end part in the frame of the solar battery module at the time of the mounting to penetrate the protective layer for covering the frame, for example. Therefore, the solar battery module and the lower frame can be reliably ground-connected to each other. Further, in a case where the projection has a slant with the end surface of the bottom-side end part of the solar battery module, the projection is obliquely stuck in the frame of the solar battery module, the solar battery module is more reliably prevented from backlash in the sloping direction of the roof and the transverse direction perpendicular thereto, and the ground connection between the solar battery module and the lower frame can be more reliably maintained by sticking the projection in the frame.

In a case where a projection is formed in the engagement part of the upper frame, the tip of the projection can be stuck in the frame by pressing the tip against the end surface of the top-side end part in the frame of the solar battery module at the time of the mounting to penetrate the protective layer for covering the frame, for example. Therefore, the solar battery module and the upper frame can be reliably ground-connected to each other. Further, in a case where the projection has a slant with the end surface of the top-side end part of the solar battery module, the projection is obliquely stuck in the frame of the solar battery module, the solar battery module is more reliably prevented from backlash in the sloping direction of the roof and the transverse direction perpendicular thereto and the ground connection between the solar battery module and the upper frame can be more reliably maintained by sticking the projection in the frame.

When the fixing cover in the solar battery module closer to the edge of eaves of the roof is replaced with one having a projection for snow stop formed therein, snow can be prevented from dropping from the edge of eaves. In this case, the solar battery module, the upper frame, and the lower frame, which are principal members constituting the solar battery module device, can be shared with the other solar battery module device having no projection for snow stop formed therein. Therefore, the number of components can be reduced, and the construction can be simplified. Further, the fixing cover can be easily replaced after installation. Therefore, it is easy to change specifications after the installation, for example, to change the position where a projection for snow stop is formed, to cancel providing a projection, and to conversely add a projection.

In a case where the engagement part of the upper frame has the supporting part abutted against the lower surface of the top-side end part of the solar battery module for supporting the end part from below, the pressing part located above the supporting part in the sloping direction of the roof and abutted against the upper surface of the end part supported from below by the supporting part, and the groove part located at a position above the supporting part in the sloping direction of the roof and opposite to the pressing part and recessed toward the roof compared with the supporting part, workability in mounting the solar battery module on the installing member can be improved.

That is, in the engagement part, the top-side end part of the solar battery module can be inserted into the groove part diagonally from above through an opening between the supporting part and the pressing part with the solar battery module inclined, which leads to insertion easy. Further, the bottom-side end part of the solar battery module whose top-side end part is inserted into the groove part can be placed on the placing surface of the lower frame by rotating the end part downward with the vicinity of the top-side end part used as a support, and the top-side end part of the solar battery module can be fixed in the vertical direction by the supporting part and the pressing part by supporting the end part from below by the supporting part as well as abutting the pressing part against the upper surface of the end part.

Therefore, workability in mounting the solar battery module on the installing member can be improved. Further, damage to the solar battery module can be also prevented by preventing pressure and distortion from being forcedly applied to the solar battery module at the time of insertion. The waterstop properties of the solar battery module device can be also improved by the groove part to function as a gutter. In addition, the waterstop properties of the solar battery module device can be further improved by stopping water between the solar battery module and the upper frame using an elastic member.

In a case where at least one of the top-side end part and the bottom-side end part of the solar battery module is mounted on at least one of the upper frame and the lower frame through the conductive fitting integrally formed of a plate material having the plate-shaped upper surface part abutted against the upper surface of the end part, the plate-shaped lower surface part abutted against the lower surface of the end part, the claw parts respectively extending upward and downward in the thickness direction of the plate from both the parts, and the connecting part for connecting the upper surface part and the lower surface part, the solar battery module and the upper and lower frames can be reliably ground-connected to each other by sticking the claw parts in the frame of the solar battery module, the upper frame, the lower frame, the fixing cover, and so on when the solar battery module is mounted.

In a case where the connecting part is the cushioning part to be an elastically deformed, when the solar battery module is mounted, the cushioning part is crushed by being inserted into the engagement part of the upper frame or being sandwiched between the placing surface of the lower frame and the fixing cover to be elastically deformed to produce a reaction force, so that the solar battery module can be more reliably mounted on the installing member without producing backlash.

In a case where the installing member comprises the right and left side frames respectively holding the right and left sides of the rectangular shape of the solar battery module, both the right side frame and the left side frame are formed in such shapes that when the plurality of installing members are arranged in the direction perpendicular to the sloping direction of the roof, the right side frame of the left installing member and the left side frame of the right installing member are overlapped with each other, and the installing members are respectively provided with the protruding parts that are overlapped with and conductively connected to each other when they are arranged in the direction perpendicular to the sloping direction of the roof with both the side frames overlapped with each other, the plurality of solar battery module devices arranged in the transverse direction perpendicular to the sloping direction of the roof can be reliably ground-connected to one another through the protruding parts. Therefore, wiring operations can be simplified by omitting wiring for the ground connection over the plurality of solar battery modules.

In the method of installing the solar battery module device according to the present invention, by undergoing the steps (a) to (d) previously described for the engagement part of the upper frame having the supporting part abutted against the lower surface of the top-side end part of the solar battery module for supporting the end part from below, the pressing part located above the supporting part in the sloping direction of the roof and abutted against the upper surface of the end part supported from below by the supporting part, and the groove part located at a position above the supporting part in the sloping direction of the roof and opposite to the pressing part and recessed toward the roof compared with the supporting part, workability in mounting the solar battery module on the installing member and waterstop properties of the solar battery module device can be improved while preventing the solar battery module from damage.

That is, in the engagement part, the top-side end part of the solar battery module can be fixed in the vertical direction by the supporting part and the pressing part by inserting the top-side end part into the groove part through an opening between the supporting part and the pressing part, then rotating the bottom-side end part of the solar battery module downward with the vicinity of the top-side end part used as a support for placing the bottom-side end part on the placing surface of the lower frame, and supporting the top-side end part from below by the supporting part as well as abutting the pressing part against the upper surface of the end part, for example.

Therefore, a clearance between the supporting part and the pressing part is made larger than the thickness of the solar battery module, so that the top-side end part of the solar battery module can be easily inserted, and the end part can be fixed in the vertical direction only by rotating the solar battery module after insertion downward. As a result, workability in mounting the solar battery module on the installing member can be improved. Further, damage to the solar battery module can be also prevented by preventing pressure and distortion from being forcedly applied to the solar battery module at the time of insertion. In addition, the waterstop properties of the solar battery module device can be also improved by the groove part to function as a gutter. When the elastic member stops water between the solar battery module and the upper frame, the waterstop properties of the solar battery module device can be further improved.

BRIEF DESCRIPTION OF DRAWINGS

FIG. 12 is a cross-sectional view showing a state where the fixing cover shown in FIG. 11 is combined with the solar battery module device in the example shown in FIG. 1.

FIG. 13 is a perspective view showing another example of the embodiment of the solar battery module device according to the present invention.

EXPLANATION OF REFERENCE NUMERALS

Figure 1:
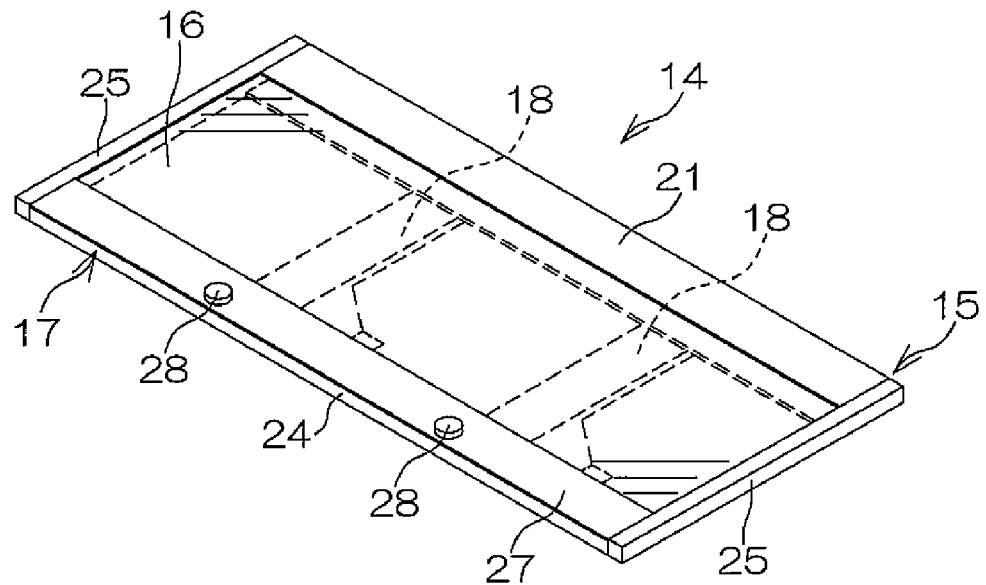
FIG. 1 is a perspective view showing an example of an embodiment of a solar battery module device according to the present invention.

14: solar battery module device
15: installing member
16: solar battery module
19: top-side end part
20: engagement part
21: upper frame
22: bottom-side end part
23: placing surface
24: lower frame
25: side frame
27: fixing cover
43: projection for snow stop
44: extended part
45: mounting part
47: end surface
48: upper surface
49: fixing part
56: projection
59: end surface
57: projection
60: supporting part
61: pressing part
62: groove part
64: elastic member (rubber sheet)
65: elastic member
68: conductive fitting
71: upper surface part
72: lower surface part
73, 74, 75, 76: claw part
77: connecting part
79: cushioning part
94: protruding part

DESCRIPTION OF THE PREFERRED EMBODIMENT

Figure 2:
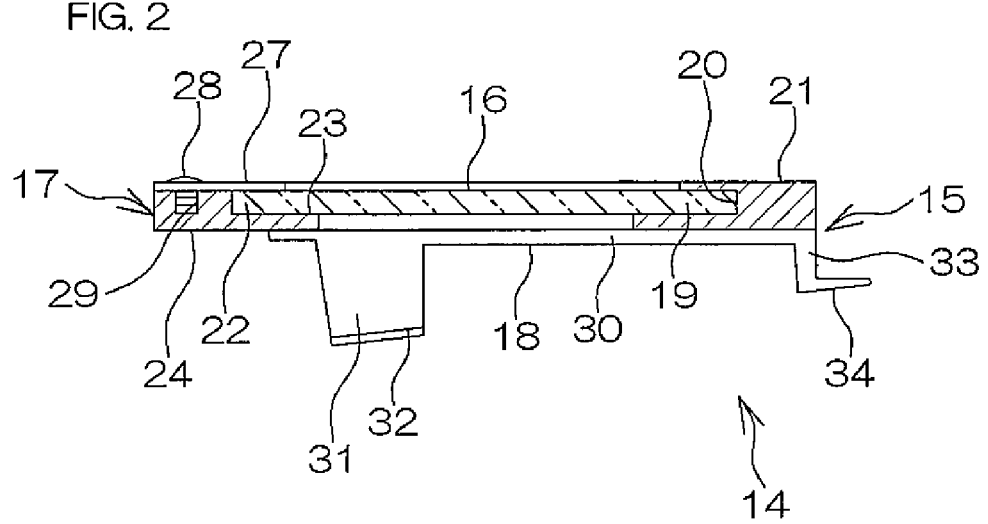
FIG. 2 is a cross-sectional view of the solar battery module device in the example shown in FIG. 1.
Figure 3:
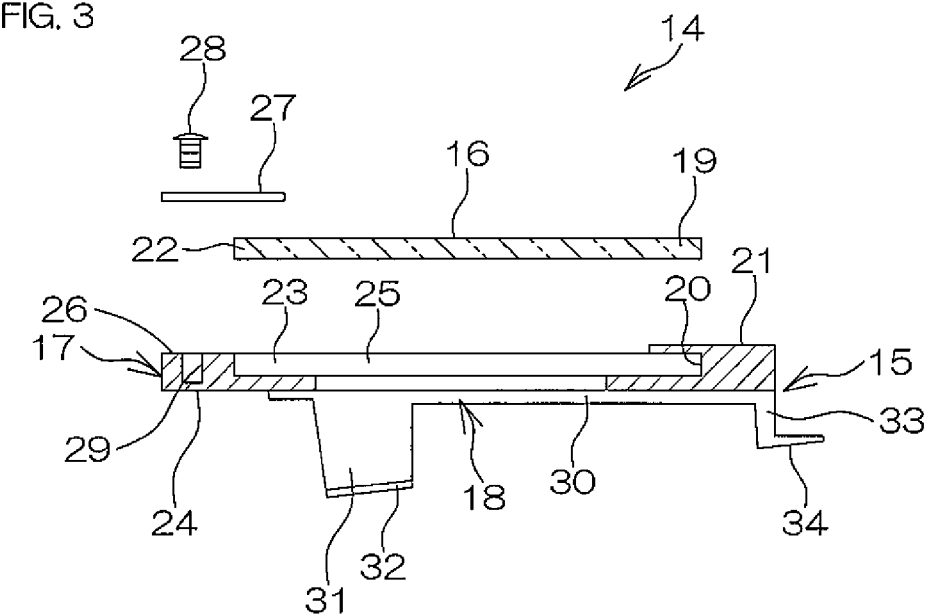
FIG. 3 is an exploded sectional view of the solar battery module device in the example shown in FIG. 1.
Figure 5:
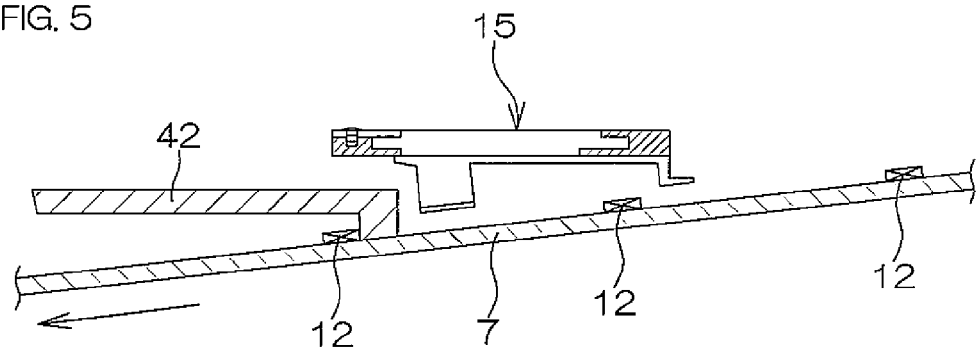
FIG. 5 is a cross-sectional view showing one step in construction for constructing a photovoltaic power generating system of a roof-integration type by installing the solar battery module device in the example shown in FIG. 1 on a roofer of a sloping roof.

FIG. 1 is a perspective view showing an example of an embodiment of a solar battery module device 14 according to the present invention. FIG. 2 is a cross-sectional view of the solar battery module device 14 in the example shown in FIG. 1. FIG. 3 is an exploded sectional view of the solar battery module device 14 in the example shown in FIG. 1. FIG. 5 is a cross-sectional view showing one step in construction for constructing a photovoltaic power generating system of a roof-integration type by installing the solar battery module device 14 in the example shown in FIG. 1 on a roofer 7 of a sloping roof. A black arrow in the figure indicates the sloping direction of the roofer 7. In the figure, the left side is the lower side, and the right side is the upper side in the sloping direction. The same applies to FIGS. 6 and 7. FIG. 8 is a perspective view of an installing member 15 in the solar battery module device 14 in the example shown in FIG. 1.

Referring to FIGS. 1, 2, and 5, the solar battery module device 14 in this example comprises a rectangular flat plate-shaped solar battery module 16, and an installing member 15 for installing the solar battery module 16 on the roofer 7 of the sloping roof. Referring to FIGS. 1, 3, and 8, the installing member 15 comprises a frame 17 formed in a rectangular shape so as to surround the solar battery module 16 in order to hold the solar battery module 16 and a pair of leg bodies 18 mounted on a lower surface of the frame 17.

Referring to FIGS. 1 to 3, 5, and 8, the frame 17 comprises an upper frame 21 disposed parallel to a transverse direction perpendicular to the sloping direction of the roofer 7 and having a groove-shaped engagement part 20 in which a top-side end part 19 serving as one side of a rectangular shape of the solar battery module 16 is fitted from the lower side in the sloping direction of the roofer 7, a lower frame 24 disposed below the upper frame 21 in the sloping direction of the roofer 7 and parallel to the upper frame 21 and having a plane-shaped placing surface 23 on which a bottom-side, end part 22 serving as the opposite side of the rectangular shape of the solar battery module 16 is placed with the end part 19 of the solar battery module 16 fitted in the engagement part 20 of the upper frame 21, and a pair of side frames 25 disposed parallel to the sloping direction of the roofer 7 for connecting both respective ends of the upper frame 21 and the lower frame 24 to each other to constitute the rectangular frame 17.

Referring to FIGS. 2 and 3, the upper frame 21 and the lower frame 24 can be respectively formed using metal materials having corrosion resistance such as an aluminum alloy or stainless steel and integrally forming the metal materials into a cross-sectional shape shown in both the figures using a processing method such as extrusion or drawing, integrally forming normal steel materials or the like and subjecting their surface to zinc plating or the like to have corrosion resistance, assembling a plurality of members made of metal, or subjecting a metal plate material to bending processing. Referring to FIGS. 2, 3, and 8, it is preferable that a lower-side surface in the figures forming the groove-shaped engagement part 20 of the upper frame 21 is made longer than an upper-side surface thereof. This allows the top-side end part 19 of the solar battery module 16 to function as a guide placed on the lower-side surface for forming the engagement part 20 for introducing the end part 19 into the engagement part 20 when the end part 19 is fitted in the engagement part 20 to improve fitting workability.

Referring to FIGS. 1 to 3 and FIG. 8, the lower frame 24 comprises a plane-shaped upper surface 26 parallel to the placing surface 23 and disposed above the placing surface 23, and a fixing cover 27 for fixing the bottom-side end part 22 of the solar battery module 16 placed on the placing surface 23 of the lower frame 24 is detachably mounted with a screw 28 screwed into a threaded hole 29 formed on the upper surface 26. The fixing cover 27 is formed in a flat plate shape.

Referring to FIGS. 1 to 3 and FIG. 8, the opening width of a groove of the engagement part 20 of the upper frame 21 may be such a size that the top-side end part 19 of the solar battery module 16 can be inserted thereinto. However, in a state where the top-side end part 19 of the solar battery module 16 is fitted into the engagement part 20, and the bottom-side end part 22 is fixed to the lower frame 24 by placing the end part 22 on the placing surface 23 and then screwing the screw 28 into the threaded hole 29 from above to mount the fixing cover 27 on the lower frame 24 (which may be hereinafter referred to as a "mounted state"), it is preferable that the opening width is set to a size that substantially coincides with the thickness of the end part 19 such that the lower-side surface forming the groove-shaped engagement part 20 and the upper-side surface are respectively abutted against a lower surface and an upper surface of the end part 19.

In the above-mentioned mounted state, it is preferable that a bottom surface of the groove-shaped engagement part 20 (an innermost surface on the right side of the engagement part 20 in FIGS. 2 and 3) is abutted against a top-side end surface of the solar battery module 16, and the distance from the bottom surface to a stepped surface between the placing surface 23 and the upper surface 26 is set to a size that substantially coincides with a size between the upper side and the lower side of the rectangular shape of the solar battery module 16 such that the stepped surface is abutted against a bottom-side end surface thereof. In the above-mentioned mounted state, it is preferable that the distance between the pair of side frames 25 is set to a size that substantially coincides with a size between both the lateral sides of the solar battery module 16 such that the side frames 25 are respectively abutted against both the lateral sides of the rectangular shape of the solar battery module 16.

Furthermore, in the above-mentioned mounted state, it is preferable that the height of a step between the placing surface 23 and the upper surface 26 is set to a size that substantially coincides with the thickness of the bottom-side end part 22 of the solar battery module 16 such that the upper surface of the bottom-side end part 22 of the solar battery module 16 is made flush with the upper surface 26 of the lower frame 24 and is abutted against the lower surface of the fixing cover 27 mounted on the upper surface 26. The employment of these configurations allows the solar battery module 16 to be held in the frame 17 in the installing member 15 without forcedly applying a force to the solar battery module 16 and with preventing backlash.

Figure 8:
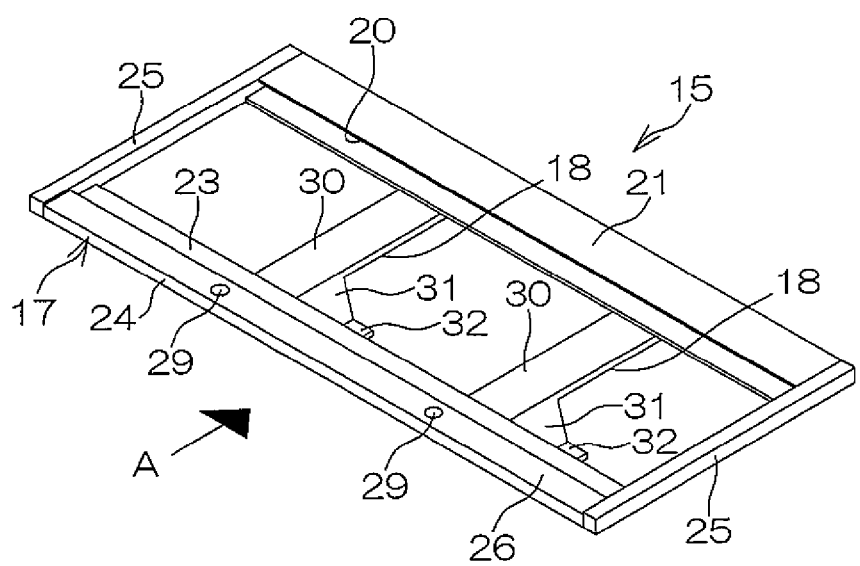
FIG. 8 is a perspective view of an installing member in the solar battery module device in the example shown in FIG. 1.
Figure 9:
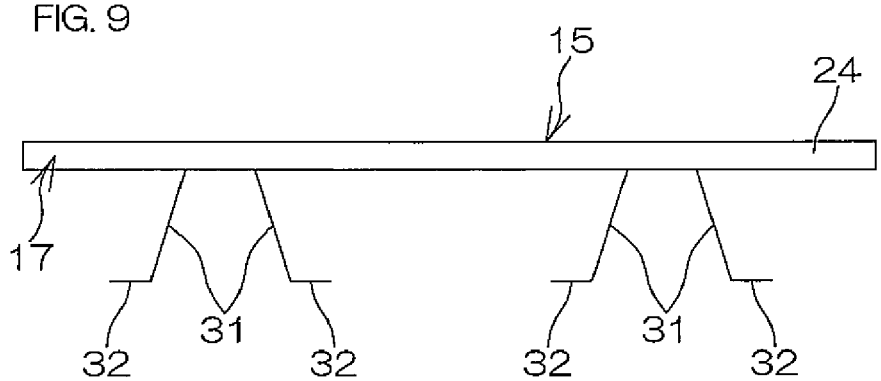
FIG. 9 is a front view of the installing member shown in FIG. 8 (view on arrow in an A direction in FIG. 8).

FIG. 9 is a front view of the installing member 15 shown in FIG. 8 (view on arrow in a direction A shown in FIG. 8). Referring to FIGS. 2, 3, 8 and 9, the leg 18 comprises a base part 30 having a length extending between both the frames 12 and 24, disposed parallel to the side frame 25, and having its one end fixed to the lower surface of the upper frame 21 and the other end fixed to the lower surface of the lower frame 24, a pair of front legs 31 extended downward from both the sides of the vicinity of an end on the side of the lower frame 24 of the base part 30, mounting parts 32 to the roofer 7 that are extended in a transverse direction perpendicular to the sloping direction of the roofer 7 and in opposite directions from respective lower ends of the pair of front legs 31, a rear leg 33 extended downward from an end on the side of the upper frame 21 of the base part 30, and a mounting part 34 extended the upper side in the sloping direction of the roofer 7 from a lower end of the rear leg 33 for mounting on the roofer 7. In the leg 18, the foregoing parts can be integrally formed by cutting one metal plate or the like having corrosion resistance as well as subjecting the metal plate to bending processing, for example. It is preferable that each of the mounting parts 32 and 34 is provided with a through hole through which a nail, a screw, or the like for mounting on the roofer 7 is inserted, though not illustrated.

Figure 10:
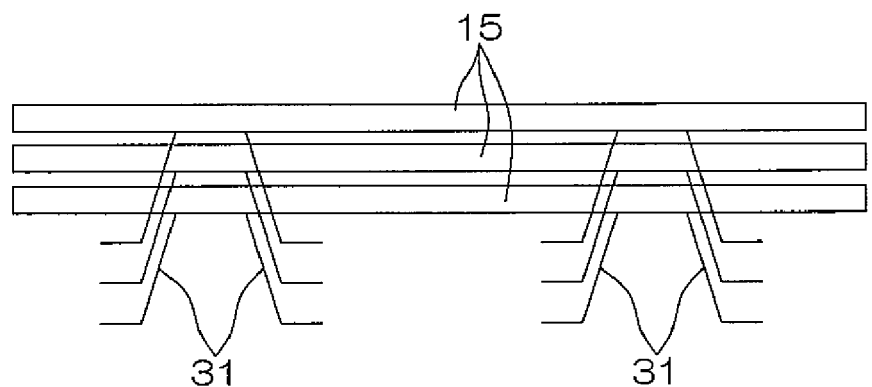
FIG. 10 is a front view showing a state where a plurality of installing members shown in FIG. 8 are laminated.

FIG. 10 is a front view showing a state where a plurality of installing members 15 as shown in FIG. 8 are piled. Referring to FIGS. 9 and 10, when the plurality of installing members 15 are piled, it is preferable that the leg 18 is formed to incline the pair of front legs 31 such that spacing therebetween gradually increases downward from the base 29 such that the respective front legs 31 in the upper and lower installing members 15 do not interfere with each other. This allows to reduce a space in conveying and storing the installing member 15, for example, by restraining a height in a case where the plurality of installing members 15 are piled.

Figure 4:
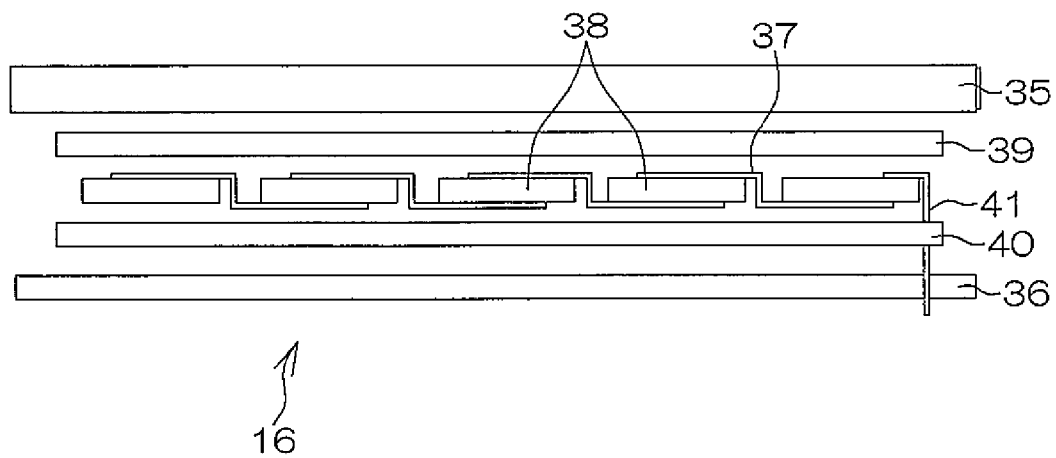
FIG. 4 is a cross-sectional view showing the internal configuration of a solar battery module in the solar battery module device in the example shown in FIG. 1.

FIG. 4 is a cross-sectional view showing the internal configuration of the solar battery module 16 in the solar battery module device 14 in the example shown in FIG. 1. Referring to FIG. 4, the solar battery module 16 in this example is formed in a rectangular flat plate shape by respectively sandwiching a plurality of solar battery cells 38 electrically connected to one another through connection tubs 37 between a translucent substrate 35 and a back sheet 36 as well as bonding with adhesives a laminated body sealed by filling clearances among the parts with respective fillers 39 and 40 on the side of a light receiving surface and the side of a rear surface, for example, to hold the laminated body in a frame made of metal (not shown). An output of the solar battery cell 38 is introduced to the outside of the solar battery module 16 through output wiring 41.

Figure 6:
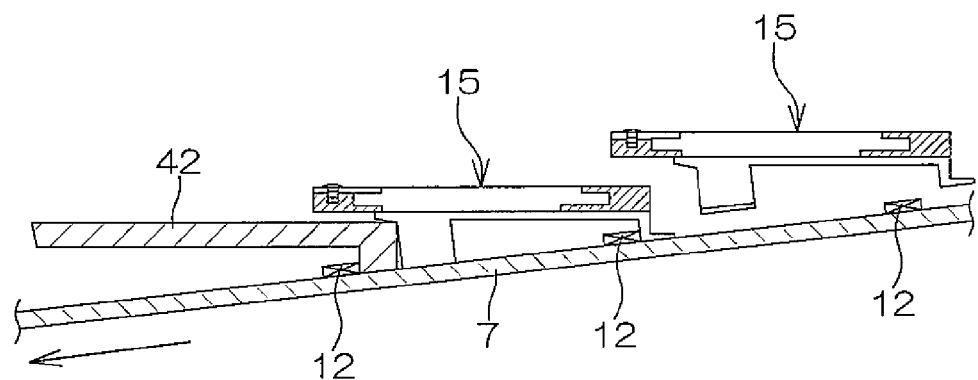
FIG. 6 is a cross-sectional view showing the subsequent step in the above-mentioned construction.
Figure 7:
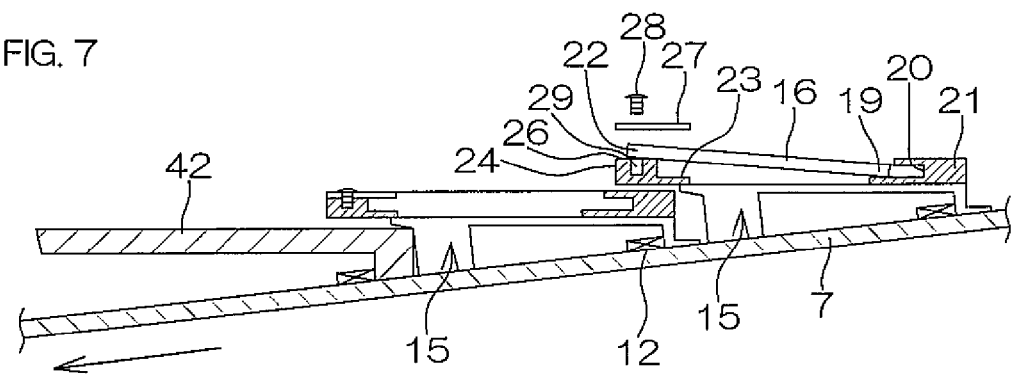
FIG. 7 is a cross-sectional view showing the further subsequent step in the above-mentioned construction.

FIGS. 6 and 7 are cross-sectional views respectively showing steps subsequent to the steps shown in FIG. 5, constructing a photovoltaic power generating system of a roof-integration type by installing the solar battery module device 14 in the example shown in FIG. 1 on the roofer 7 of the sloping roof. The figures show a case where the solar battery module device 14 is installed on the roofer 7 together with a roofing material 42 having a cross-sectional shape similar to that of the solar battery module device 14 to construct the roof-integration type photovoltaic power generating system. Therefore, in terms of the ease of installation and the appearance of the photovoltaic power generating system after installation, it is preferable that the plane shape of the solar battery module device 14 defined by the external shape of the frame 17 is made substantially equal in shape and size to that corresponding to one roofing material 42 or a plurality of (two or more) roofing materials 42.

Referring to FIGS. 5 and 6, in order to install the solar battery module device 14 in the example shown in FIG. 1 comprising the foregoing parts together with the roofing material 42 on the roofer 7 of the sloping roof, the roofing material 42 and the installing member 15 in the solar battery module device 14 are fixed on the roofer 7 with crosspieces 12 equally spaced on the roofer 7 used as a reference. In both the figures, the members are fixed in order from an edge of eaves to a ridge of the roof, as in the conventional example. However, the members may be conversely fixed in order from the ridge to the edge of eaves, or may be fixed at random. In the case, the roofer 7 is exposed in a portion between the frame 17 and the leg 18 in the installing member 15. Therefore, a worker can operate for fixing the installing member 15 and the roofing material 42 by standing directly on the exposed roofer 7 or standing on the roofing material 42, resulting in improving safety.

Referring to FIG. 7, at the time when the fixing of all the roofing materials 42 and the installing members 15 is completed or even at the time when the fixing operations are in progress, the solar battery modules 16 are successively mounted on the installing members 15 already fixed. Specifically, the top-side end part 19 of the solar battery module 16 is fitted in the engagement part 20 of the upper frame 21 in the installing member 15 fixed on the roofer 15 from the lower side in the sloping direction of the roofer 7 (from the left side in FIG. 7), and the bottom-side end part 22 of the solar battery module 16 is fixed to the lower frame 24 by placing the bottom-side end part 22 on the placing surface 23 of the lower frame 24 and then screwing the screw 28 into the threaded hole 29 from above to mount the fixing cover 27 on the lower frame 24 to mount the solar battery module 16 on the installing member 15. In addition thereto, output wiring 41 in the solar battery module 16 is connected to a bus (not shown). In this manner, the installation of one solar battery module device is completed.

Operations for mounting the solar battery module 16 can be mainly performed from the lower side of the mounting member 15. Accordingly when the mounting operations are performed starting with the uppermost installing member 15 in the sloping direction of the roofer 7 (the right installing member in FIG. 7), as shown in FIG. 7, the worker can operate for mounting the solar battery module 16 by standing directly on the roofer 7 exposed in a portion between the frame 17 and the leg 18 of the installing member 15 on which the solar battery module 16 is not mounted yet of the mounted installing member 15 or standing on the roofing material 42. Therefore, it is possible to improve the safety of the mounting operations as well as to prevent the solar battery module from damage.

Figure 11:
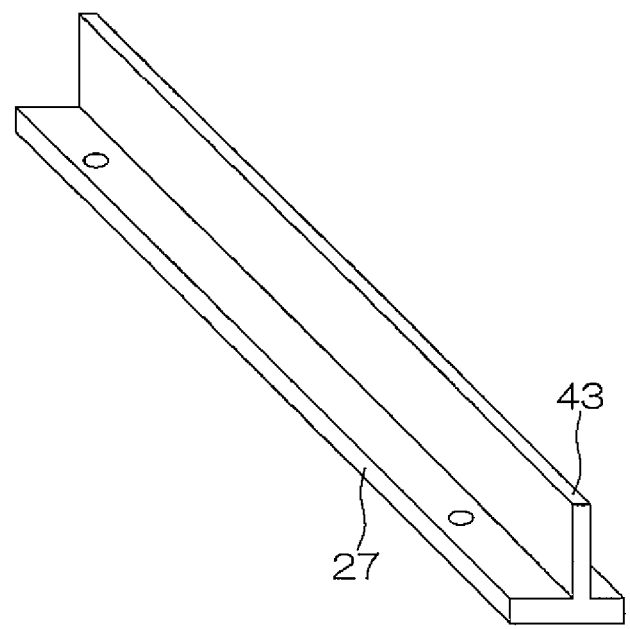
FIG. 11 is a perspective view showing a modified example of a fixing cover.

FIG. 11 is a perspective view showing a modified example of the fixing cover 27. FIG. 12 is a cross-sectional view showing a state where the fixing cover 27 shown in FIG. 11 is combined with the solar battery module device 14 in the example shown in FIG. 1. Referring to both the figures, the fixing cover 27 in this example differs from the previously described flat plate-shaped fixing cover 27 in that a flat plate-shaped projection 43 for snow stop is extended over the whole length of the fixing cover 27 upward from its upper surface. The fixing cover 27 may be integrally formed by a processing method such as extrusion or drawing and may be formed by assembling a plurality of members and subjecting a plate material to bending processing, similarly to the upper frame 21 or the like.

Referring to FIG. 12, a snow stopping function for preventing snow from dropping from the edge of eaves can be given to the solar battery module device 14 in the example shown in FIG. 1 using the fixing cover 27 for fixing the bottom-side end part 22 of the solar battery module 16 in place of the normal flat plate-shaped fixing cover 27. In this case, the solar battery module 16 serving as a principal member constituting the solar battery module device 14 and the installing member 15 including the upper frame 21 and the lower frame 24 can be shared with the other solar battery module device 14 having no projection 43 for snow stop formed therein, so that the number of components can be reduced and the construction can be simplified. Further, the fixing cover 27 can be always replaced with the normal flat plate-shaped fixing cover 27. Therefore, it is easy to change specifications after installation, for example, to change the position where the projection 43 for snow stop is formed, to cancel providing the projection 43, and to conversely add the projection 43.

Figure 16:
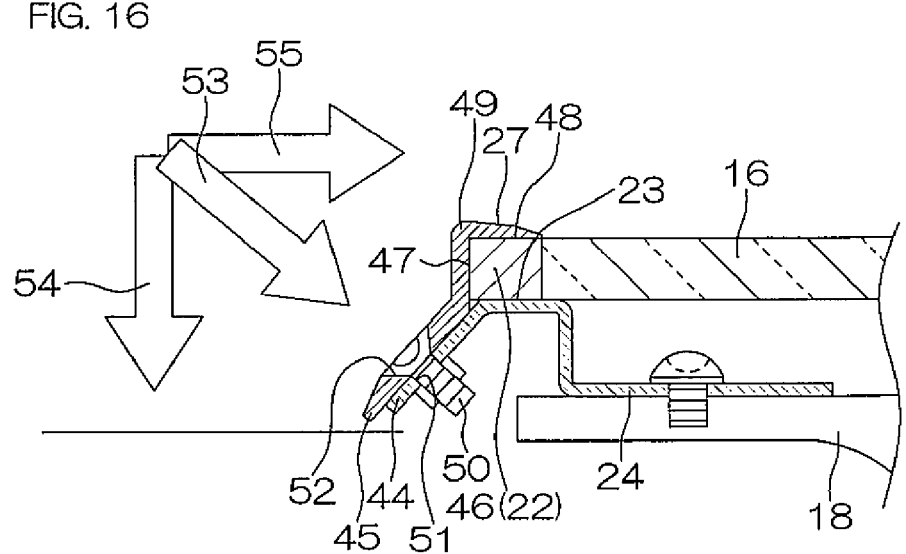
FIG. 16 is a cross-sectional view showing in enlarged fashion a lower frame and a fixing cover that constitute a principal part of the solar battery module device in the example shown in FIG. 13.
Figure 18:
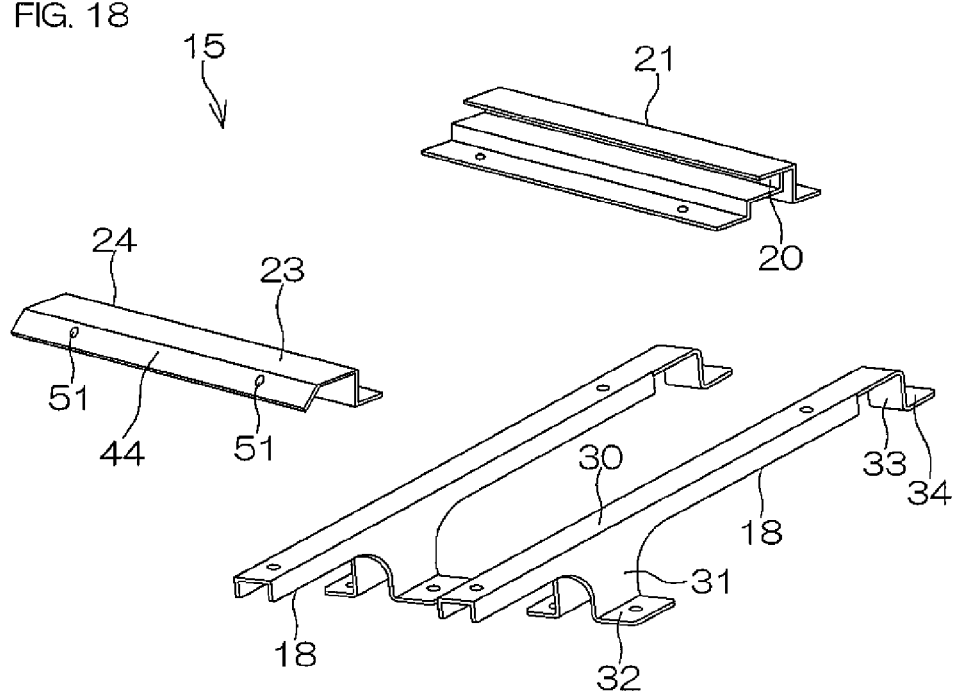
FIG. 18 is an exploded perspective view of an installing member in the solar battery module device in the example shown in FIG. 13.

FIG. 13 is a perspective view showing another example of the embodiment of the solar battery module device 14 according to the present invention. FIG. 16 is an enlarged sectional view of a lower frame 24 and a fixing cover 27 constituting a principal part of the solar battery module device 14 in the example shown in FIG. 13. FIG. 18 is an exploded perspective view of an installing member 15 in the solar battery module device 14 in the example shown in FIG. 13.

Referring to the figures, the solar battery module device 14 in this example differs from that in the example shown in FIG. 1 in that a lower frame 24 has a flat plate-shaped extended part 44 extended in a slopingly downward direction of a surface of a solar battery module 16 to be mounted on the lower side in the sloping direction of a roofer 7 (on the left side in FIG. 16), and a fixing cover 27 has a flat plate-shaped mounting part 45 overlapped with and mounted on the extended part 44 and a fixing part 49 abutted against an end surface 47 and an upper surface 48 of a frame 46 forming a bottom-side end part 22 in a frame of the solar battery module 16 for fixing the bottom-side end part 22 to a lower frame 24.

This example also differs from the example shown in FIG. 1 in that the installing member 15 does not have a side frame 25. The functions of the other parts are the same as those in the example shown in FIG. 1 except that an upper frame 21 is formed by subjecting a plate material to bending processing, for example. Therefore, the same parts are denoted by the same reference numerals and hence, the description thereof is omitted. In the example shown in FIG. 13, a frame forming a side of the solar battery module 16 in the frame of the solar battery module 16 is used to function as a substitute for the side frame 25. However, rainwater can be also prevented from entering from an area between adjacent solar battery modules 16 and a clearance between the solar battery module 16 and a roofing material 42 without omitting the side frame 25 but giving the side frame 25 a function as a gutter, for example.

Referring to FIGS. 16 and 18, the lower frame 24 is formed by subjecting the plate material to bending processing similarly to the upper frame 21, and comprises a flat plate part having its upper surface serving as a placing surface 23 and the above-mentioned extended part 44 formed continuously to the flat plate part below the flat plate part in the sloping direction of the roofer 7. The extended part 44 is provided with a threaded hole 51 in which a screw 50 for fixing a mounting part 45 overlapped therewith is screwed. Referring to FIGS. 13 and 16, the fixing cover 27 is also formed by subjecting a plate material to bending processing similarly to both the frames 21 and 24, and comprises a fixing part 49 formed in an angle shape abutted against the end surface 47 and the upper surface 48 of the end part 22 of the solar battery module 16, and the above-mentioned mounting part 45 formed continuously from a lower end of a portion abutted against the end surface 47 of the fixing part 49 slopingly downward along the extended part 44 of the lower frame 24. Further, the mounting part 45 is formed with a through hole 52 through which the screw 50 is inserted and in which the head thereof is fitted.

Figure 14:
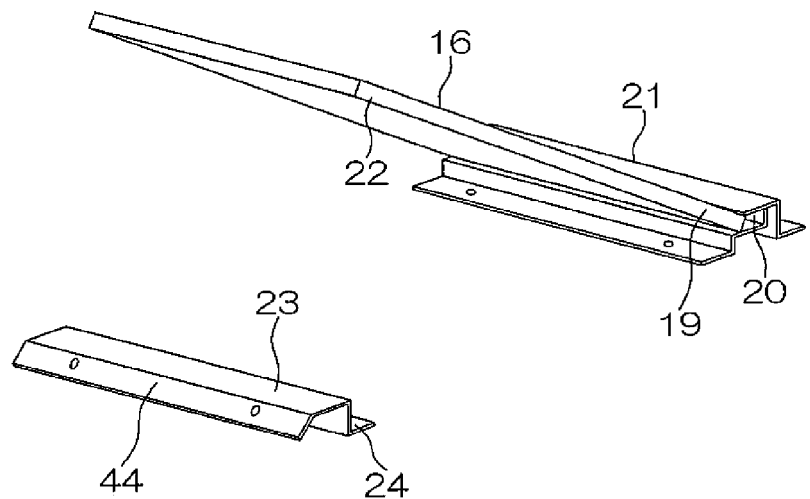
FIG. 14 is a perspective view showing a state during the step of assembling the solar battery module device in the example shown in FIG. 13.
Figure 15:
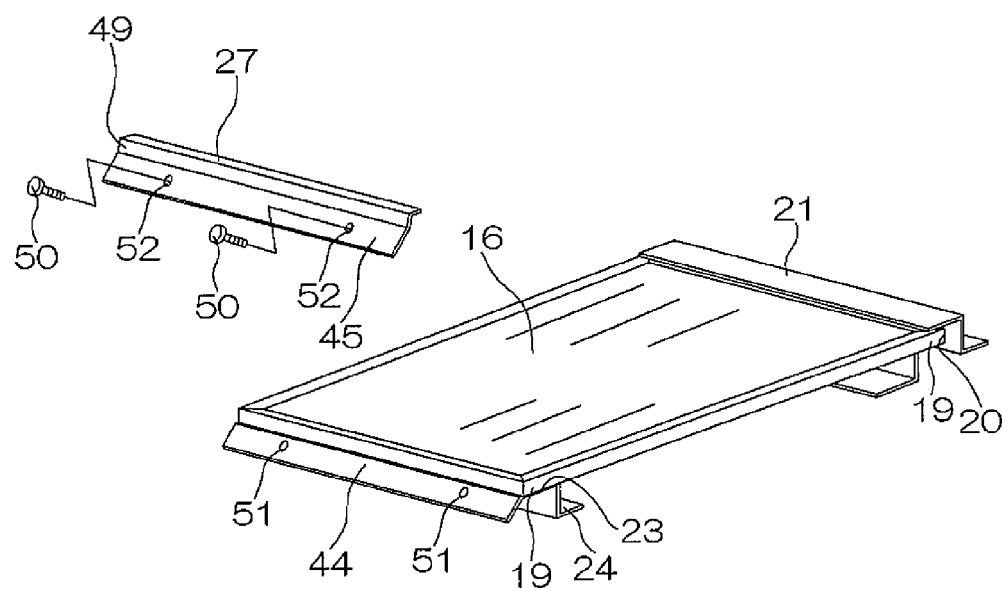
FIG. 15 is a perspective view showing the subsequent state in the above-mentioned step.

FIGS. 14 and 15 are perspective views showing states during the step of assembling the solar battery module device 14 in the example shown in FIG. 13. FIGS. 21 to 24 are cross-sectional views respectively showing states during the above-mentioned steps. In order to assemble the solar battery module device 14 in this example, a top-side end part 19 of the solar battery module 16 is placed on a surface on the lower side in the figures, forming a groove-shaped engagement part 20 of the upper frame 21 from the lower side in the sloping direction of the roofer 7 (from front side in both the figures) with reference to FIGS. 14 and 21. As indicated by a hollow arrow in FIG. 21, the bottom-side end part 22 of the solar battery module 16 is rotated downward having the position where the top-side end part 19 is abutted against a lower-side surface of the engagement part 20 used as a support for placing a portion in the vicinity of the bottom-side end part 22 on the placing surface 23 of the lower frame 24.

Figure 22:
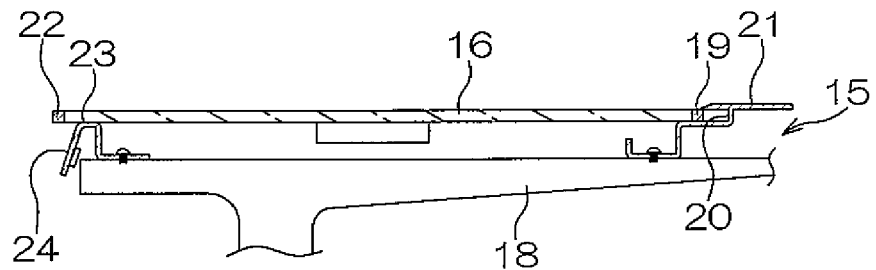
FIG. 22 is a cross-sectional view showing the subsequent state in the above-mentioned step.
Figure 23:
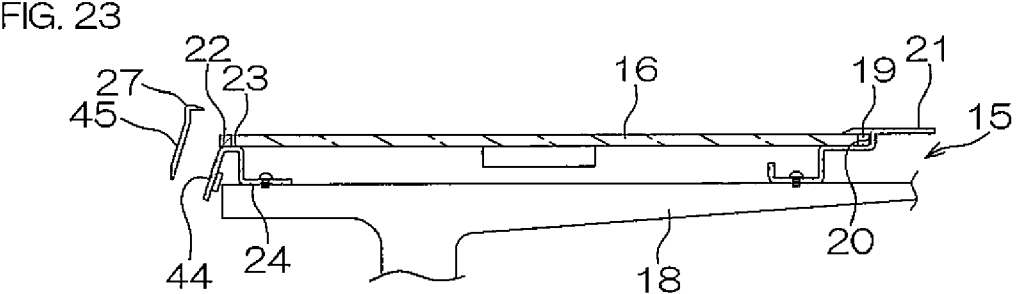
FIG. 23 is a cross-sectional view showing the subsequent state in the above-mentioned step.
Figure 24:
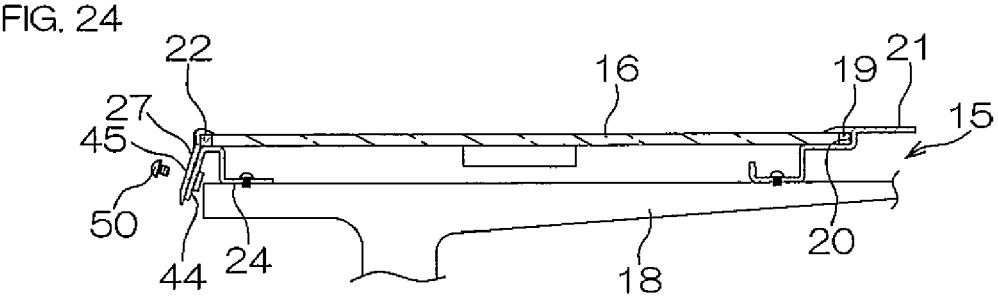
FIG. 24 is a cross-sectional view showing the further subsequent state in the above-mentioned step.

Referring to FIG. 22, the solar battery module 16 is then moved toward the upper frame 21, as indicated by a hollow arrow in the figure, having the lower-side surface of the engagement part 20 and the placing surface 23 used as a guide to fit the top-side end part 19 of the solar battery module 16 into the engagement part 20 of the upper frame 21. Then referring to FIGS. 15, 23, and 24, the fixing part 49 in the fixing cover 27 is abutted against the end surface 47 and the upper surface 48 of the bottom-side end part 22 of the solar battery module 16, and the mounting part 45 in the fixing cover 27 is overlapped with and mounted on the extended part 44 by inserting the screw 50 through the through hole 52 and screwing the screw 50 into the threaded hole 51 with the mounting part 45 overlapped with the extended part 44 of the lower frame 24.

Consequently, referring to FIG. 16, as a component of a fixing force 53 directed diagonally downward, which is perpendicular to a plane direction of the extended part 44 in the figures, generated by screwing the screw 50 into the threaded hole 51 for fixing the mounting part 45 on the extended part 44, a fixing force 54 directed downward in the thickness direction, that is, toward the placing surface 23 of the lower frame 24 can be applied to the bottom-side end part 22 of the solar battery module 16 from the upper surface 48 thereof through the fixing part 49, and a fixing force 55 directed toward the upper frame 21 can be applied to the end part 22 from the end surface 47 through the fixing part 49.

Therefore, the solar battery module 16 mounted on the installing member 15 can be more reliably mounted by preventing backlash or the like of the solar battery module 16. Consequently, it is possible to reliably prevent the solar battery module 16 from deterioration, for example, due to the occurrence of corrosion by preventing a protective film such as alumite or a plating layer for covering a surface of the frame of the solar battery module 16 from being damaged and chipped to thinning down due to backlash of the solar battery module 16 against the installing member 15, for example. Further, a balance between the fixing forces 54 and 55 can be also adjusted by adjusting respective angles of slope of the extended part 44 and the mounting part 45.

The extended part 44 is extended in a slopingly downward direction of the surface of the solar battery module 16 to reduce the length thereof in the sloping direction of the roofer 7, so that the ratio of the length of the lower frame 24 to the length in the same direction of the whole solar battery module device 14 can be reduced. Therefore, the power generation efficiency of the photovoltaic power generating system can be also improved by reducing the loss of the power generation area thereof per unit area.

Figure 19:
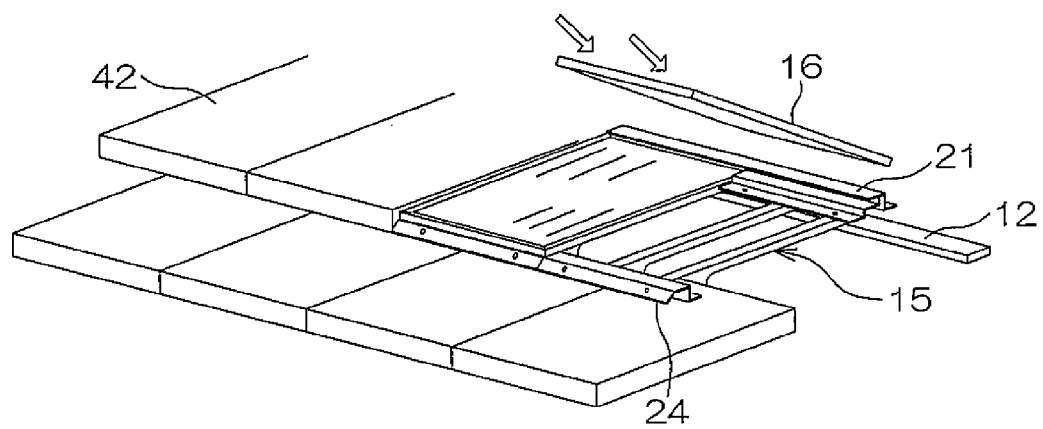
FIG. 19 is a perspective view showing one step in construction for constructing a photovoltaic power generating system of a roof-integration type using the solar battery module device in the example shown in FIG. 13.
Figure 20:
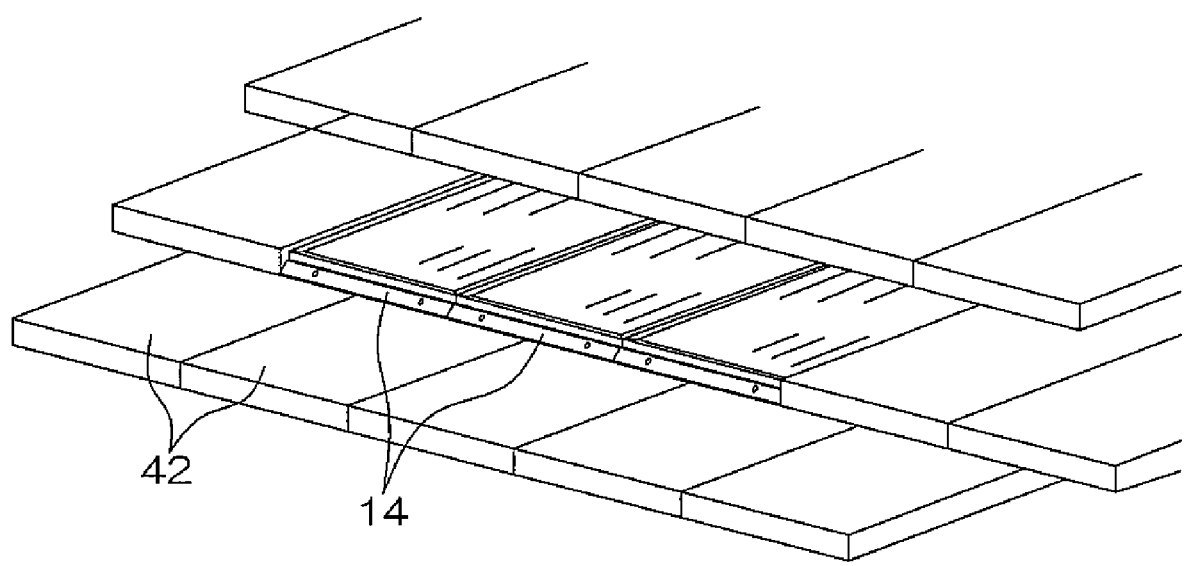
FIG. 20 is a perspective view showing a part of the completed photovoltaic power generating system.
Figure 21:
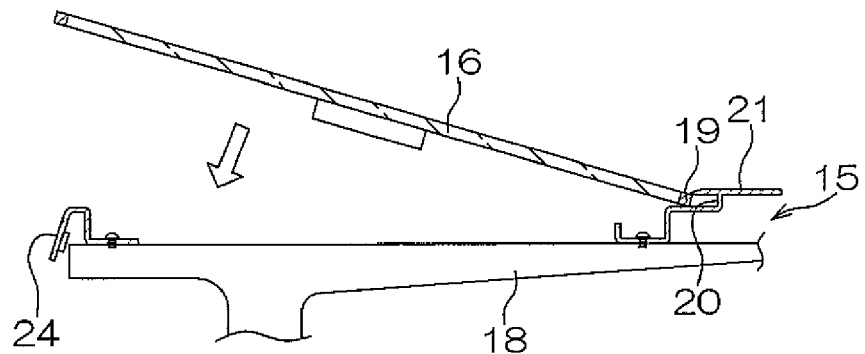
FIG. 21 is a cross-sectional view showing a state during the step of assembling the solar battery module device in the example shown in FIG. 13.

FIG. 19 is a perspective view showing one step in construction for constructing a photovoltaic power generating system of a roof-integration type using the solar battery module device 14 in the example shown in FIG. 13. FIG. 20 is a perspective view showing a part of the completed photovoltaic power generating system. The figures show a case where the solar battery module device 14 in the example shown in FIG. 13 is installed on a roofer 7 together with a roofing material 42 having a cross-sectional shape similar to the solar battery module device 14 to construct a photovoltaic power generating system of a roof-integration type. Although a plane shape of the solar battery module device 14 is made substantially equal in shape and size to one roofing material 42 in both the figures, it can be also made substantially equal in shape and size to a plurality of (two or more) roofing materials 42.

Referring to FIG. 19, in order to install the solar battery module device 14 in the example shown in FIG. 13 comprising the above-mentioned parts on the roofer 7 of the sloping roof, together with the roofing material 42, the roofing material 42 and the installing members 15 in the solar battery module device 14 are fixed on the roofer 7 with crosspieces 12 equally spaced on the roofer 7 used as a reference, as in the example shown in FIG. 1, and the solar battery module 16 may be mounted on the fixed and optional installing member 15 in order in the procedure previously described. Referring to FIG. 20, the completed photovoltaic power generating system has a superior appearance in which the roofing material 42 and the solar battery module device 14 having a plane shape substantially equal to that of the roofing material 42 are harmonized with each other.

Figure 17:
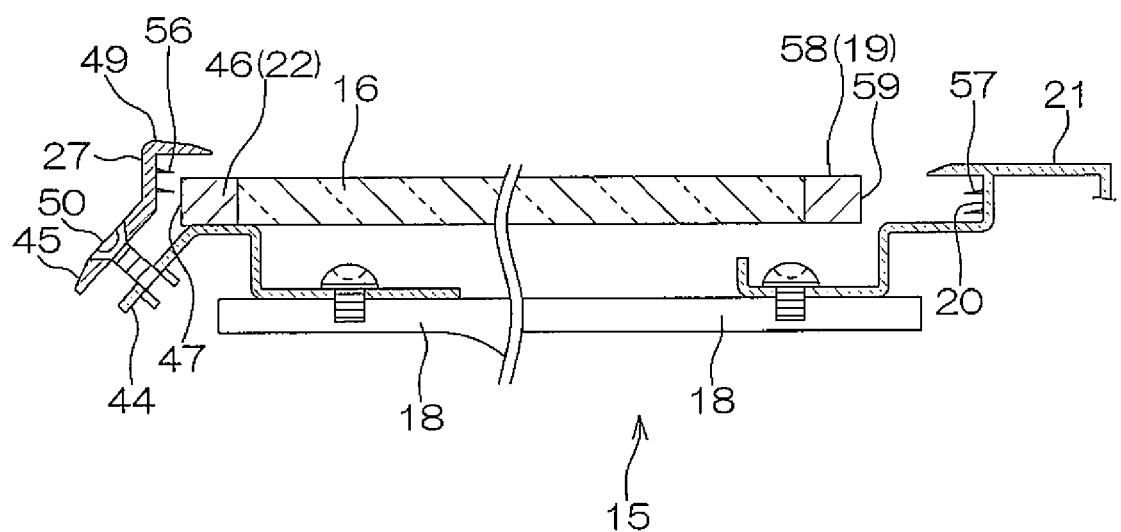
FIG. 17 is a cross-sectional view showing a modified example of a fixing cover and an upper frame.

FIG. 17 is a cross-sectional view showing the modified example of the fixing cover 27 and the upper frame 21. Referring to FIG. 17, a fixing cover 27 in this example differs from the fixing cover 27 in the example shown in FIG. 13 in that a projection 56 is formed on a surface abutted against an end surface 47 of a bottom-side end part 22 of a solar battery module 16 of a fixing part 49. The projection 56 is formed integrally with the fixing cover 27 formed by subjecting a plate material to bending processing as previously described, by cutting and raising a plate material forming a surface abutted against the end surface 47 of the fixing part 49 in the fixing cover 27, for example.

Furthermore, an upper frame 21 in this example differs from the upper frame 21 in the example shown in FIG. 13 in that a projection 57 similar to the one described above is formed on a bottom surface of a groove-shaped engagement part 20 (an innermost surface on the right side of an engagement part 20 in FIG. 17). The projection 57 is formed integrally with the upper frame 21 formed by subjecting the plate material to bending processing as previously described, by cutting and raising a plate material forming a bottom surface of the engagement part 20 of the upper frame 21, for example.

Referring to FIG. 17, in order to mount the solar battery module 16 on the installing member 15 comprising the fixing cover 27 and the upper frame 21 respectively having the projections 56 and 57 in the same procedure as in the example shown in FIG. 13, when a fixing force for fixing the mounting part 45 to the extended part 44 by screwing the screw 50 into the threaded hole 51 is produced, a fixing force 55 directed toward the upper frame 21 is applied as its component to the end part 22 from the end surface 47 through the fixing part 49, so that a tip of the projection 56 can be stuck in the frame 46 forming the bottom-side end part 22 by being pressed against the end surface 47 of the frame 46 in the frame of the solar battery module 16 and penetrating a protective layer or the like covering the frame 46. Therefore, the solar battery module 16 and the lower frame 24 can be reliably ground-connected to each other.

In addition thereto, the tip of the projection 57 can be stuck in the frame 58 forming the top-side end part 19 by being pressed against the end surface 59 of the frame 58 in the frame of the solar battery module 16 and penetrating a protective layer or the like covering the frame 58. Therefore, the solar battery module 16 and the upper frame 21 can be also reliably ground-connected to each other.

When both the projections 56 and 57 respectively has a slant to both with the end surfaces 47 and 59 of the solar battery module 16, backlash of the solar battery module 16 in the sloping direction of the roofer 7 and in the transverse direction perpendicular thereto can be more reliably prevented by obliquely stacking the projections 56 and 57 in the frames 46 and 58 forming the frame of the solar battery module 16, and the ground connection between the solar battery module 16 and the upper and lower frames 21 and 24 by stacking the projections 56 and 57 in the frames 46 and 58 can be more reliably maintained over a long time period.

Figure 25:
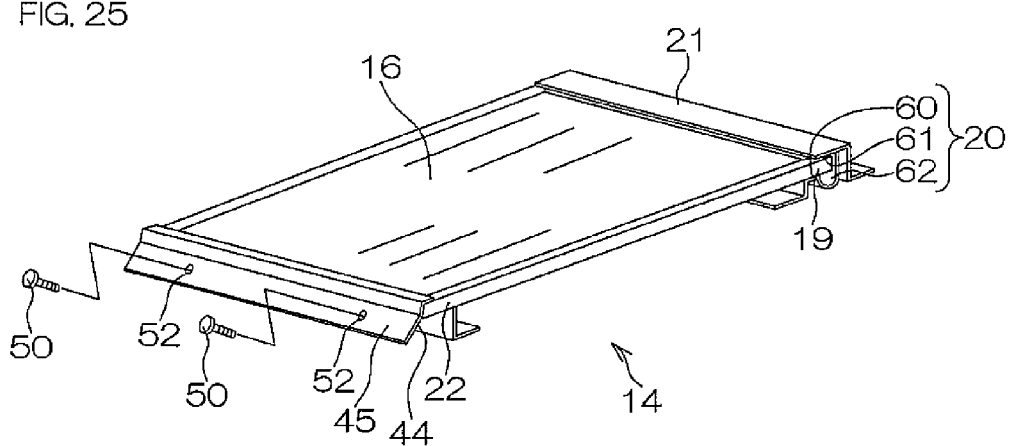
FIG. 25 is a perspective view showing another example of an embodiment of a solar battery module device according to the present invention.
Figure 26:
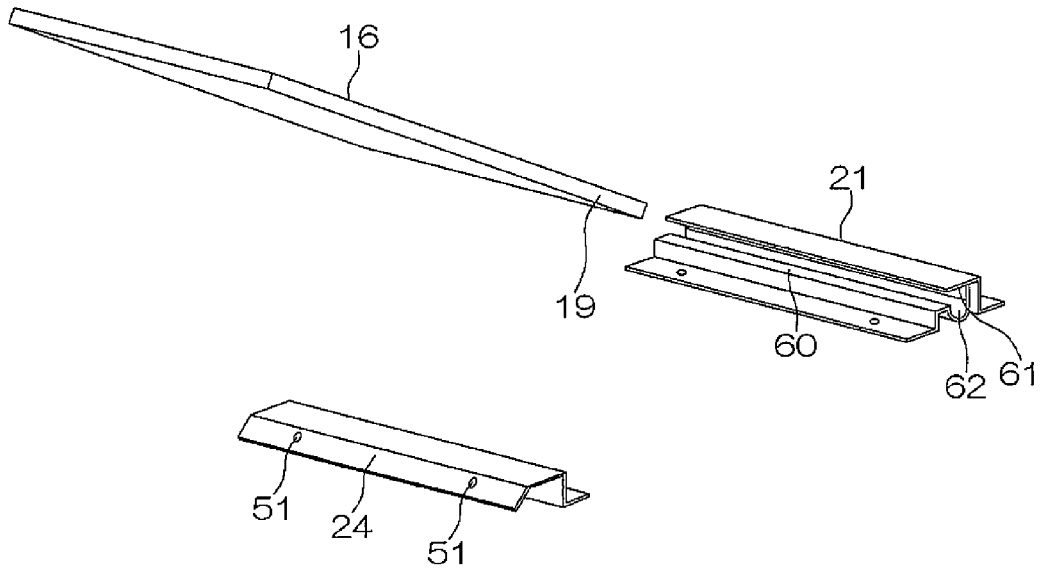
FIG. 26 is a perspective view showing a step in process of installing the solar battery module device in the example shown in FIG. 25 on a roofer by an installing method according to the present invention.
Figure 27:
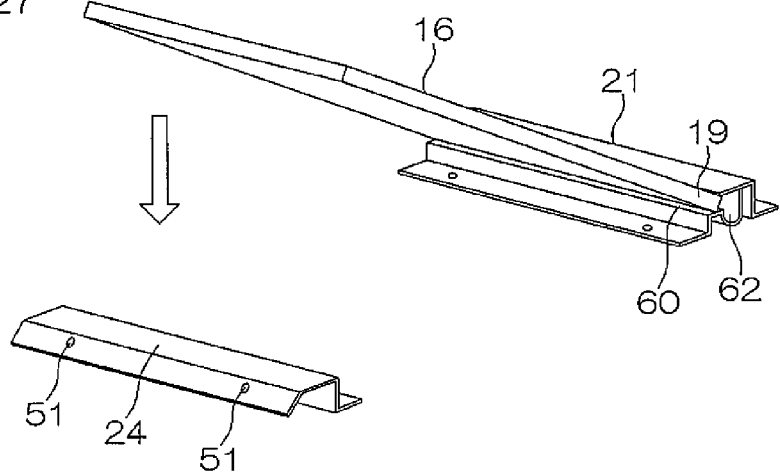
FIG. 27 is a perspective view showing the subsequent step in the installing method.
Figure 28:
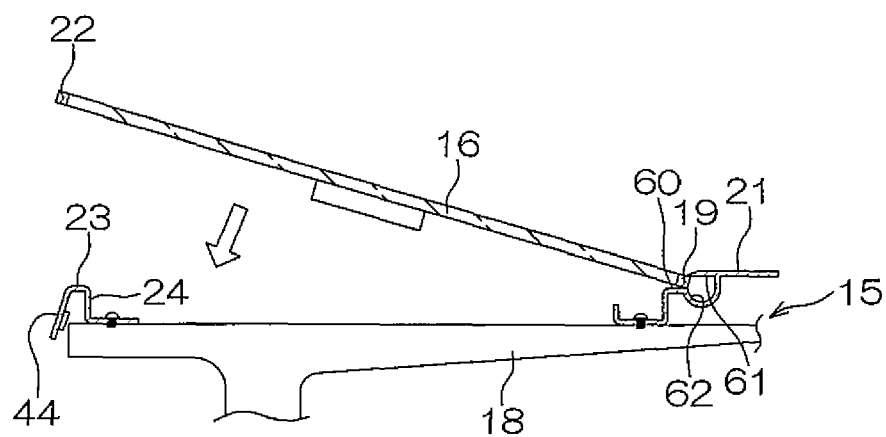
FIG. 28 is a cross-sectional view showing a step in process of installing the solar battery module device in the example shown in FIG. 25 on a roofer by the installing method according to the present invention.
Figure 29:
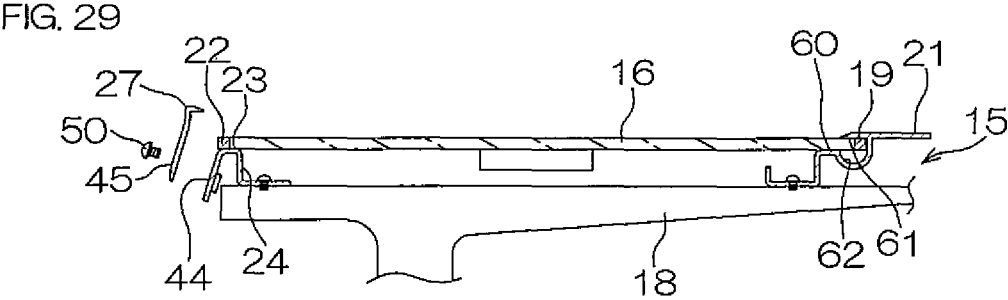
FIG. 29 is a perspective view showing the subsequent step in the installing method.
Figure 30:
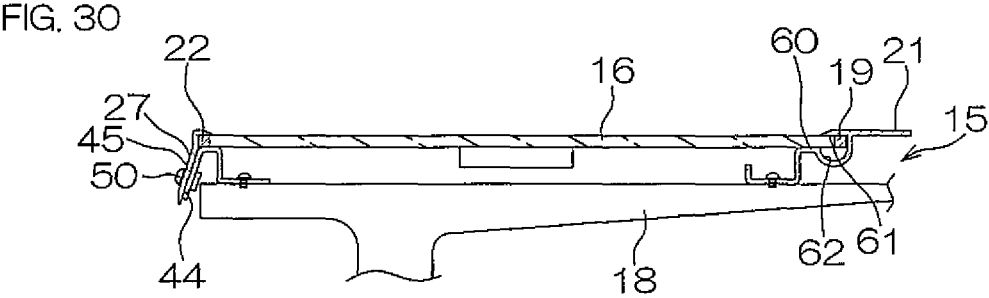
FIG. 30 is a perspective view showing the subsequent step in the installing method.
Figure 31:
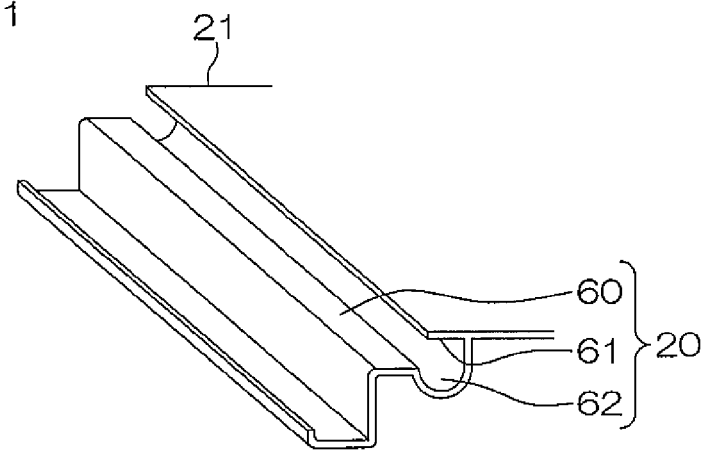
FIG. 31 is a perspective view showing an upper frame constituting a principal part of the solar battery module device in the example shown in FIG. 25.

FIG. 25 is a perspective view showing another example of the embodiment of the solar battery module device 14 according to the present invention. FIGS. 26 and 27 are perspective views respectively showing steps in process of installing the solar battery module device 14 in the example shown in FIG. 25 on a roofer 7 by an installing method according to the present invention. FIGS. 28 to 30 are cross-sectional views respectively showing steps in process of installing the solar battery module device 14 in the example shown in FIG. 25 on the roofer 7 by the installing method according to the present invention. FIG. 31 is a perspective view showing an upper frame 21 constituting a principal part of the solar battery module device 14 in the example shown in FIG. 25.

Referring to FIGS. 25 to 31, the solar battery module device 14 in this example differs from that in the example shown in FIG. 13 in that an engagement part 20 in an upper frame 21 has a plane-shaped supporting part 60 abutted against a lower surface of a top-side end part 19 of a solar battery module 16 for supporting the end part 19 from below, a plane-shaped pressing part 61 located above the supporting part 60 in the sloping direction of the roofer 7 (on the innermost side in both the figures) and abutted against an upper surface of the end part 19 supported from below by the supporting part 60, and a groove part 62 having a semicircular shape in cross section, located at a position above the supporting part 60 in the sloping direction of the roofer 7 and opposite to the pressing part 61 and recessed toward the roofer 7 compared with the supporting part 60. Since the other parts are the same as those in the example shown in FIG. 13, the same parts are denoted by the same reference numerals and hence, the description thereof is omitted. The frame 21 is formed by subjecting a plate material to bending processing, as in the example shown in FIG. 13.

Referring to FIGS. 26 to 28, in order to install the solar battery module device 14 in the example shown in FIG. 25 on the roofer 7 by the installing method according to the present invention, an installing member 15 is first fixed on the roofer 7 [step (a)], and the top-side end part 19 of the solar battery module 16 is then inserted into the groove part 62 through an opening between the supporting part 60 and the pressing part 61 of the fixed installing member 15 on the lower side in the sloping direction of the roofer 7 (on the front side in FIGS. 26 and 27 and on the left side in FIG. 28) and diagonally downward from above the upper frame 21 with the solar battery module 16 sloping such that the top-side end part 19 is below the bottom-side end part 22 [step (b)].

Referring now to FIGS. 27 and 28, the bottom-side end part 22 of the solar battery module 16 is rotated downward, as indicated by a hollow arrow in both the figures having the vicinity of the end part 19 inserted into the groove part 62 used as its support for placing the end part 22 on a placing surface 23 of a lower frame 24, and the top-side end part 19 thereof is supported from below by the supporting part 60, and the pressing part 61 is abutted against an upper surface of the end part 19 [step (c)]. Consequently, referring to FIGS. 29 and 30, the top-side end part 19 of the solar battery module 16 can be fixed in the vertical direction by the supporting part 60 and the pressing part 61.

Thereafter, when the mounting part 45 of the fixing cover 27 is fixed to the extended part 44 in the lower frame 24 by screwing a screw 50 into a threaded hole 51 in the extended part 44 through a through hole 52 in the mounting part 45 with the mounting part 45 overlapped with the extended part 44 to fix the bottom-side end part 22 of the solar battery module 16 to the lower frame 24 by the fixing cover 27, the mounting of the solar battery module 16 is completed [step (d)].

The solar battery module device 14 in the example shown in FIG. 25 and the installing method according to the present invention using the same improve workability in mounting the solar battery module 16 on the installing member 15 and can prevent the solar battery module 16 from damage at the time of the mounting. That is, a worker can operate insertion in a relatively comfortable position because the top-side end part 19 of the solar battery module 16 can be inserted into the groove part 62 from a high viewing location by holding the vicinity of the bottom-side end part 22 of the solar battery module 16, for example. Further, when a bottom-side edge of the supporting part 60 in the sloping direction of the roofer 7 is set to a position slightly shifted upward from a top-side edge of the pressing part 61 in the sloping direction of the roofer 7, for example, the insertion can be more easily performed by increasing the distance between both the edges for defining the opening width of an opening for inserting the end part 19 of the solar battery module 16 into the groove part 62 larger than the thickness of the end part 19.

Moreover, after the top-side end part 19 is inserted, the top-side end part 19 can be fixed in the vertical direction only by rotating the bottom-side end part 22 of the solar battery module 16 downward, as previously described, for placing the end part 22 on the placing surface 23 of the lower frame 24, and supporting the end part 19 from below by the supporting part 60 as well as abutting the pressing part 61 against the upper surface of the end part 19. Thus, the number of steps in operations for mounting the solar battery module 16 on the installing member 15 can be also reduced. Therefore, workability in mounting the solar battery module 16 on the installing member 15 can be improved, and damage to the solar battery module 16 can be also prevented by preventing pressure and distortion from being forcedly applied thereto at the time of insertion.

Figure 32:
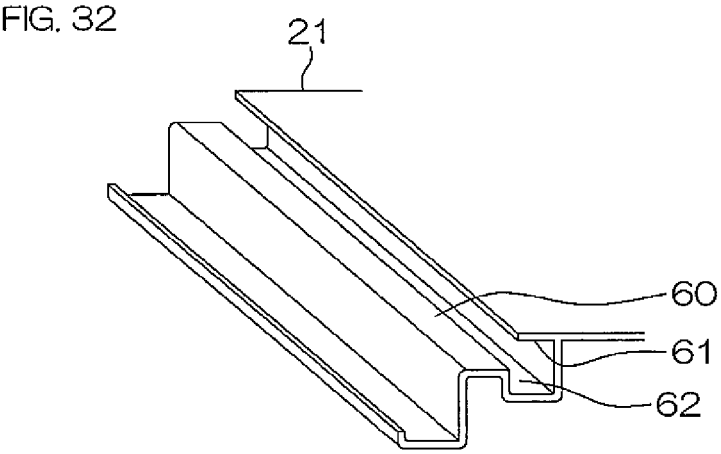
FIG. 32 is a perspective view showing a modified example of the upper frame.
Figure 33:
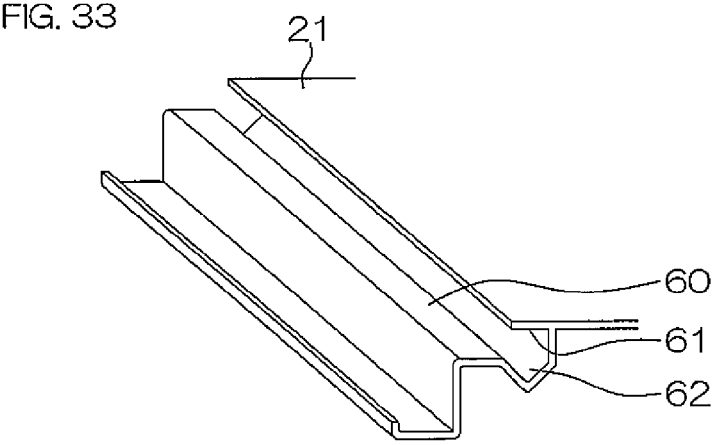
FIG. 33 is a perspective view showing another modified example of the upper frame.

FIGS. 32 and 33 are perspective views respectively showing a modified example of the upper frame 21. First referring to FIG. 32, an upper frame 21 in the example as shown in the figure differs from that in the previously described example shown in FIG. 31 in that a cross-sectional shape of a groove part 62 is substantially rectangular. Referring to FIG. 33, an upper frame 21 in the example as shown in the figure differs from that in the example shown in FIG. 31 in that a cross-sectional shape of the groove part 62 is substantially triangular. Further, the cross-sectional shape of the groove part 62 can be also a shape other than the shapes in the examples shown in the above-mentioned figures. In short, the cross-sectional shape of the groove part 62 is not particularly limited, provided that the rotation of an end part 22 of a solar battery module 16 having an end part 19 thereof inserted thereinto is not prevented.

Figure 34:
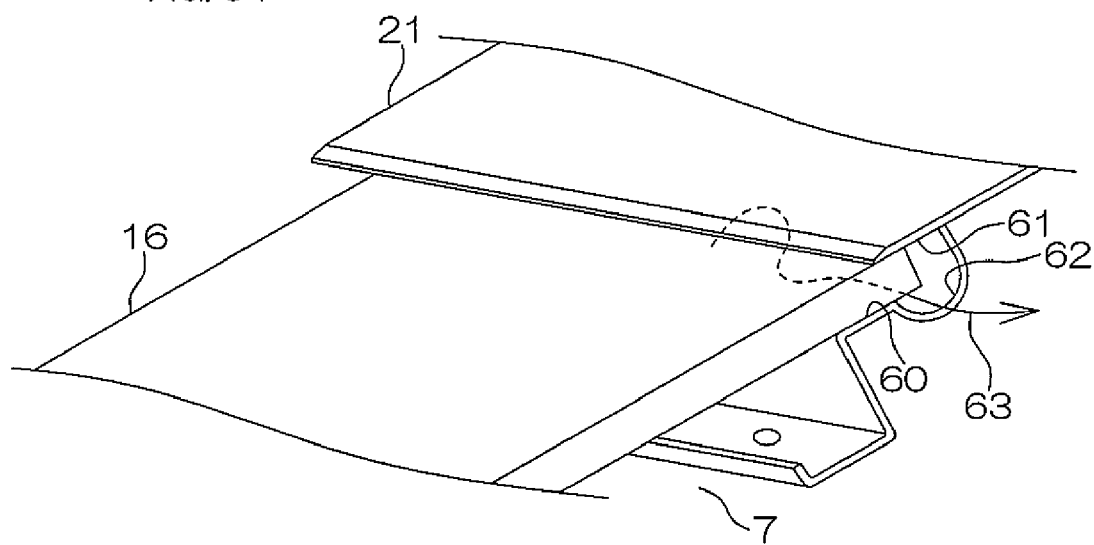
FIG. 34 is a perspective view for explaining the flow of rainwater in the upper frame in the solar battery module device in the example shown in FIG. 25.

FIG. 34 is a perspective view for explaining the flow of rainwater in the upper frame 21 in the solar battery module device 14 in the example shown in FIG. 25. Referring to FIG. 34, the solar battery module device 14 in the example shown in FIG. 25, it is possible to improve the waterstop properties thereof by the groove part 62 of the upper frame 21 to function as a gutter to prevent rainwater 63 entered from a clearance between the solar battery module 16 and a pressing part 61 of the upper frame 21 from entering onto the roofer 7 as indicated by a solid-line arrow and a broken-line arrow in the figure.

Figure 35:
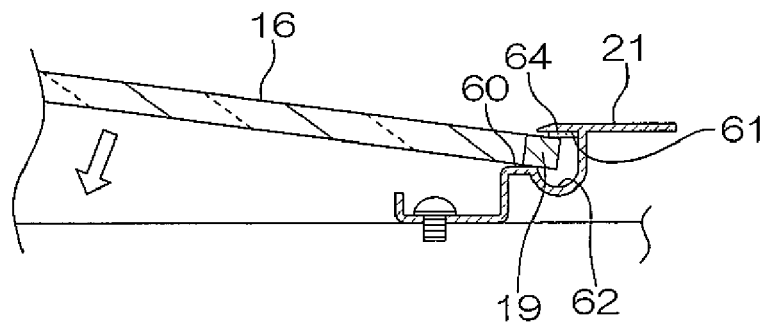
FIG. 35 is a cross-sectional view showing a state in process during the step of inserting a rubber sheet serving as an elastic member between a solar battery module and a pressing part of an upper frame in the installing method according to the present invention.
Figure 36:
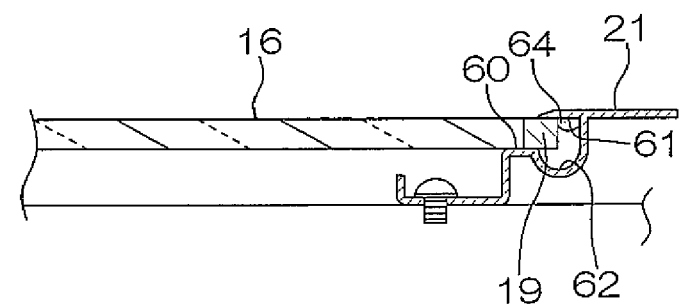
FIG. 36 is a cross-sectional view showing a state where an elastic member is inserted.

FIG. 35 is a cross-sectional view showing a state in process during the step of inserting a rubber sheet 64 serving as an elastic member into an area between the solar battery module 16 and the pressing part 61 of the upper frame 21. FIG. 36 is a cross-sectional view showing a state where the rubber sheet 64 is inserted. Referring to both the figures, in the installing method according to the present invention, the rubber sheet 64 is previously mounted on the pressing part 61 prior to the step (b). As the end 21 of the solar battery module 16 is rotated downward (indicated by a hollow arrow in FIG. 35), the end part 19 thereof inserted into the groove part 62 is conversely rotated upward to insert the rubber sheet 64 into an area between the end part 19 and the pressing part 61. Consequently, the waterstop properties of the solar battery module device 14 can be further improved by shutting off an entrance path of the rainwater 63, previously shown in FIG. 34, using the rubber sheet 64.

Figure 37:
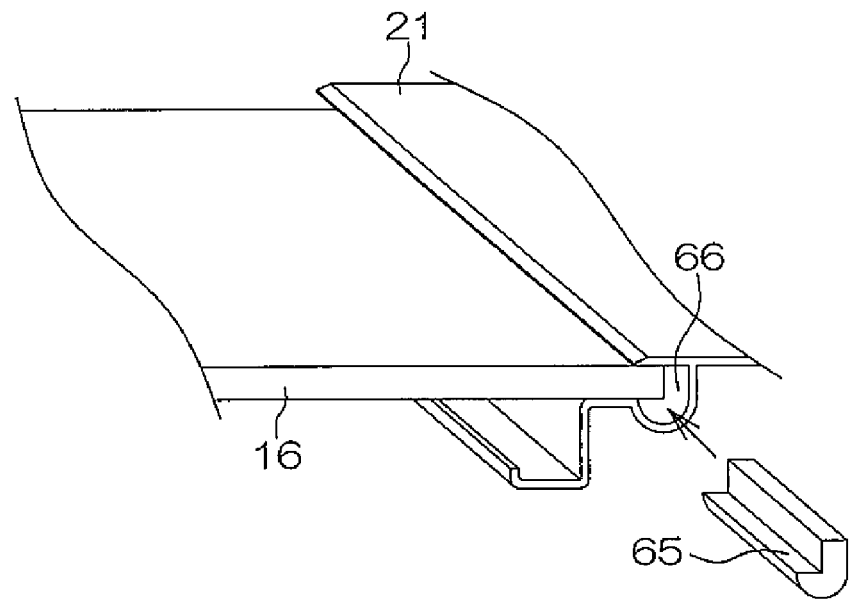
FIG. 37 is a perspective view showing a modified example of an elastic member inserted between a solar battery module and an upper frame in the solar battery module device in the example shown in FIG. 25.
Figure 38:
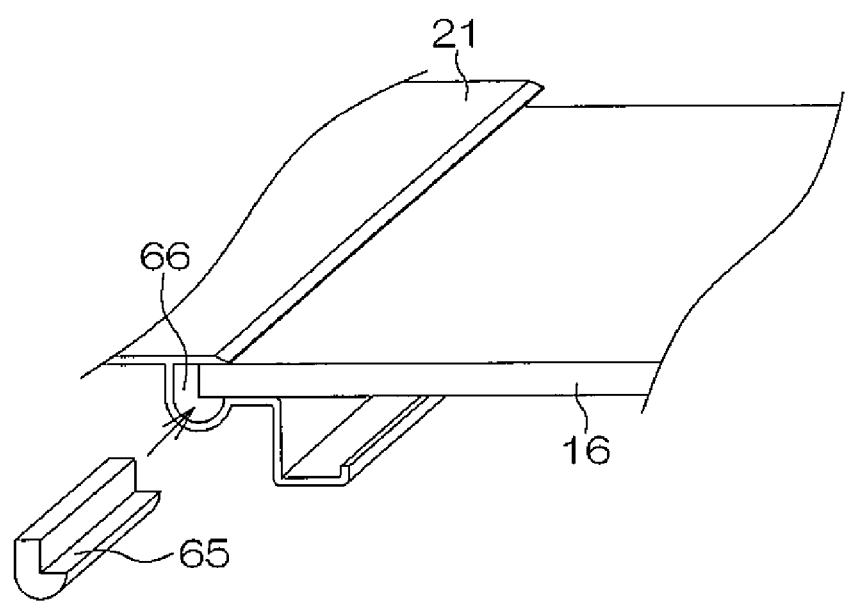
FIG. 38 is a perspective view showing an elastic member inserted on the opposite side of FIG. 37.

FIG. 37 is a perspective view showing a modified example of the elastic member 65 inserted between the solar battery module 16 and the upper frame 21 in the solar battery module device 14 in the example shown in FIG. 25. FIG. 38 is a perspective view showing an elastic member 65 inserted on the opposite side of FIG. 37. Referring to both the figures, an elastic member 65 in this example has a cross-sectional shape corresponding to a space 66 between an upper frame 21 and a top-side end part 19 of a solar battery module 16 fitted in the upper frame 21 in a state as shown in both the figures where the installation of the solar battery module 16 in an installing member 15 is completed. The waterstop properties of a solar battery module device 14 can be further improved by inserting the elastic member 65 into the space 66 from both sides of the upper frame 21 to shut off an entrance path of the rainwater 63, previously shown in FIG. 34.

Figure 39:
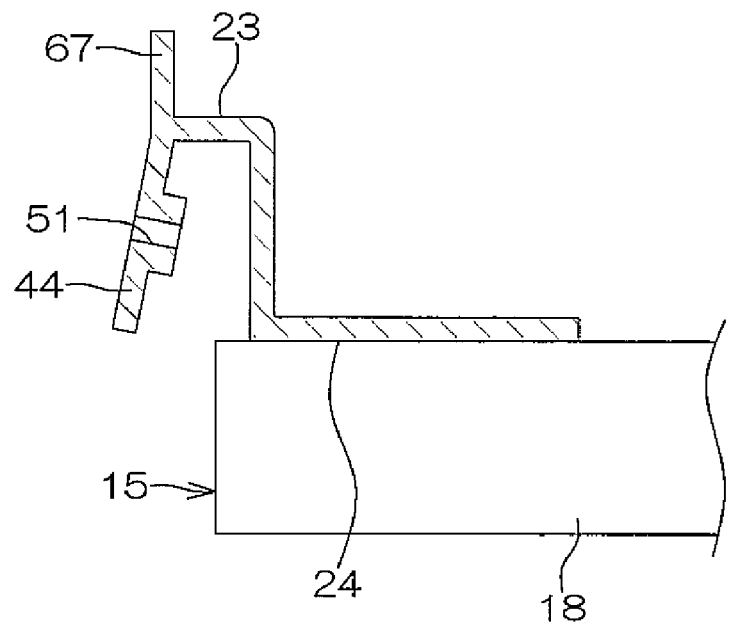
FIG. 39 is a cross-sectional view showing a modified example of a lower frame in the solar battery module device shown in FIG. 25.
Figure 40:
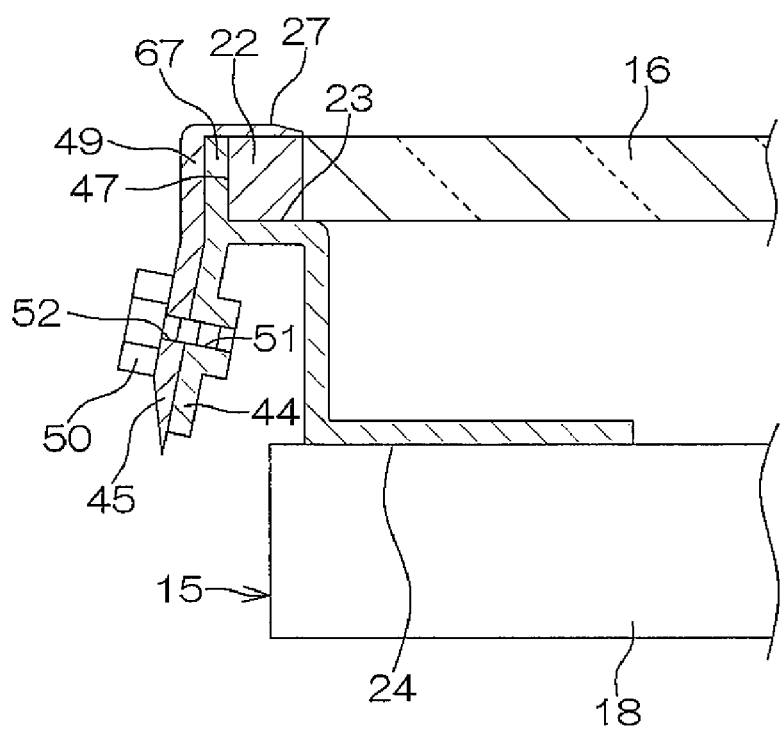
FIG. 40 is a cross-sectional view showing a state where a bottom-side end part of a solar battery module is fixed to the lower frame.

FIG. 39 is a cross-sectional view showing a modified example of the lower frame 24 in the solar battery module device 14 shown in FIG. 25. FIG. 40 is a cross-sectional view showing a state where a bottom-side end part 22 of a solar battery module 16 is fixed to the lower frame 24. Referring to both the figures, the lower frame 24 in this example differs from the lower frame 24 in the example shown in FIG. 25 in that when the bottom-side end part 22 of the solar battery module 16 is placed on a placing surface 23, a projection 67 abutted against an end surface 47 of the end part 22 is formed upward from the lower side of the placing surface 23 in the sloping direction of a roofer 7 (from the left side in FIG. 39).

As previously described, according to the solar battery module device 14 in the example shown in FIG. 25 and the installing method according to the present invention using the same, the top-side end part 19 of the solar battery module 16 can be fixed in the vertical direction only by inserting the top-side end part 19 into the groove part 62, then rotating the bottom-side end part 22 of the solar battery module 16 downward for placing the end part 22 on the placing surface 23 of the lower frame 24, and supporting the top-side end part 19 thereof from below by the supporting part 60 as well as abutting the pressing part 61 against the upper surface of the end part 19.

In the fixing operations, the bottom-side end part 22 of the solar battery module 16 can be placed at a predetermined fixing position on the placing surface 23 while being aligned at the same time that the bottom-side end part 22 is rotated downward and placed on the placing surface 23. If the projection 67 is provided as in the example shown in FIG. 39 and used as a reference for alignment by abutting the end surface 47 of the end part 22 of the solar battery module 16 against the projection 67, operations for placing the end part 22 at the predetermined position on the placing surface 23 can be performed more simply.

Furthermore, the projection 67 can function as a stopper for the solar battery module 16 having the end part 22 placed on the placing surface 23. Even on a sloping roof, therefore, the solar battery module 16 can be temporarily placed without fixing the end part 22 by mounting a fixing cover 27 on the lower frame 24. The number of variations of the procedure for installing the solar battery module device 14 can be increased by adding the temporarily placing step.

In the lower frame 24 shown in the example, a part of the weight of the solar battery module 16 can be received by the projection 67. When the end part 22 of the solar battery module 16 is fixed on the placing surface 23 by abutting a fixing part 49 of the fixing cover 27 against a surface of the projection 67 opposite to a surface against which the end surface 47 of the end part 22 is abutted and an upper surface 48 of the end part 22 as well as inserting a screw 50 through a through hole 52 and screwing the screw 50 into a threaded hole 51 with a mounting part 45 in the fixing cover 27 overlapped with an extended part 44 in the lower frame 24, the weight of the solar battery module 16 can be avoided being concentrically applied to the screw 50 and a portion of the threaded hole 51 into which the screw 50 is screwed in the extended part 44.

Figure 41:
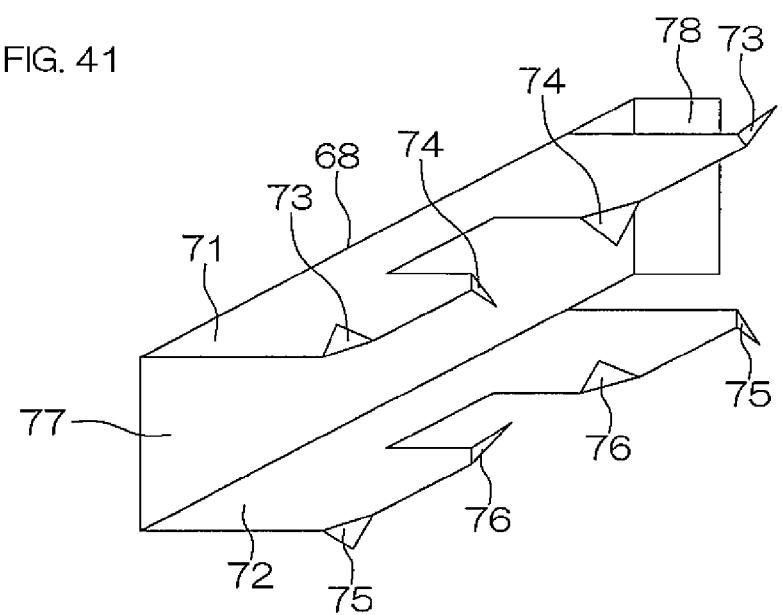
FIG. 41 is a perspective view showing an example of a conductive fitting that can be used for the solar battery module device according to the present invention.
Figure 42:
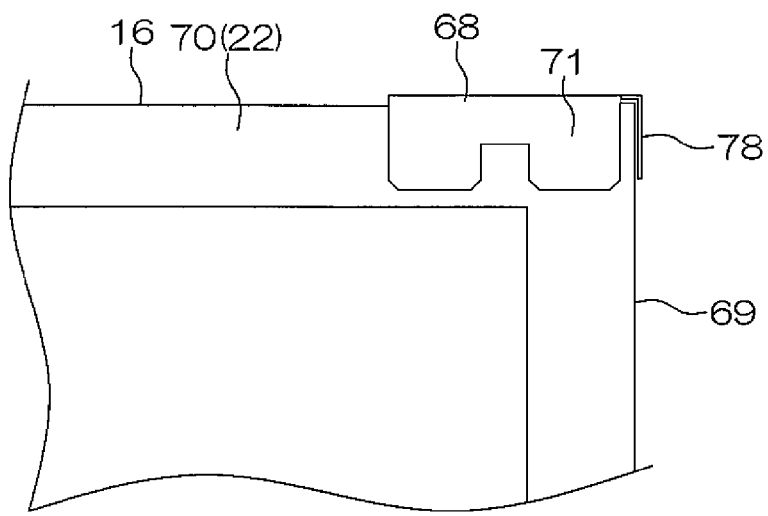
FIG. 42 is a plan view showing a state where the conductive fitting shown in FIG. 41 is attached on an end of the solar battery module.

FIG. 41 is a perspective view showing an example of a conductive fitting 68 that can be used for the solar battery module device 14 according to the present invention. FIG. 42 is a plan view showing a state where the conductive fitting 68 shown in FIG. 41 is attached on an end part of the solar battery module 16. Referring to both the figures, the conductive fitting 68 in this example has a plate-shaped upper surface part 71 abutted against an upper surface of a frame 70 forming an end of at least one of a top-side end part and a bottom-side end part of the solar battery module 16 in a frame 69 of the solar battery module 16, a plate-shaped lower surface part 72 abutted against a lower surface of the frame 70, claw parts 73 to 76 respectively extending upward and downward in the thickness direction from a plate from both the parts 71 and 72, a connecting part 77 for connecting both the parts 71 and 72, and a corner part 78 abutted against a corner between an end and a side of the frame 69 of the solar battery module 16 integrally formed of a metal plate material, having good conductive properties, being hard, and being superior in corrosion resistance, such as stainless steel.

Referring to FIGS. 1, 41 and 42, the bottom-side end part 22 is placed on the placing surface 23 of the lower frame 24 with the conductive fitting 68 attached on the frame 70 forming the bottom-side end part 22 in the frame 69 of the solar battery module 16 constituting the solar battery module device 14 in the example shown in FIG. 1, then the fixing cover 27 is then mounted on the lower frame 24 by screwing the screw 28 into the threaded hole 29 to fix the end part 22 to the lower frame 24.

Consequently, the claw part 73 projected upward in the thickness direction of the plate from the upper surface part 71 of the conductive fitting 68 is stuck in the fixing cover 27, and the claw part 74 projected downward is stuck in the upper surface of the frame 70. In addition thereto, the claw part 75 projected downward in the thickness direction of the plate from the lower surface part 72 of the conductive fitting 68 is stuck in the placing surface 23, and the claw part 76 projected upward is stuck in the lower surface of the frame 70. Therefore, between the solar battery module 16 and the lower frame 24 can be reliably ground-connected to each other. The same applies to the upper frame 21.

Figure 43:
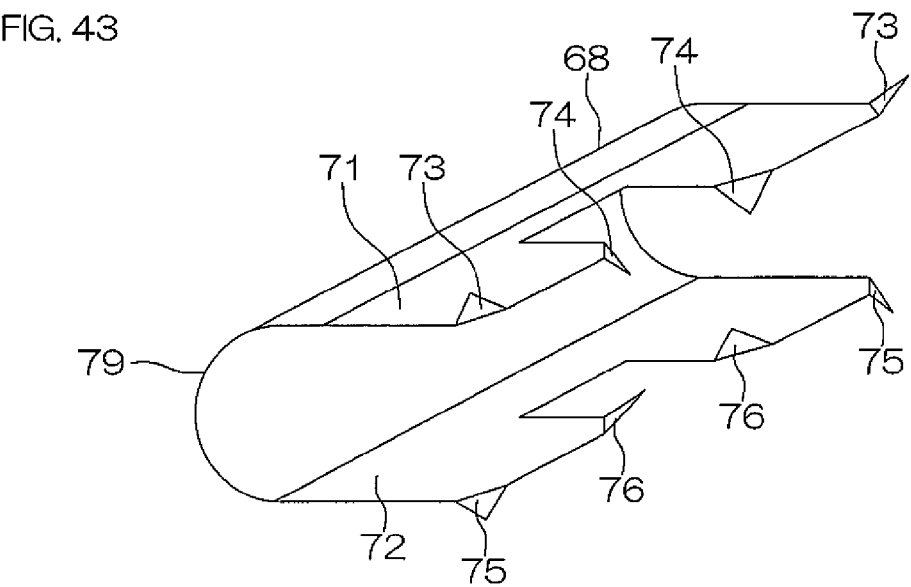
FIG. 43 is a perspective view showing another example of a conductive fitting.

FIG. 43 is a perspective view showing another example of the conductive fitting 68. A conductive fitting 68 in the figure differs from the conductive fitting in the previous example shown in FIG. 41 in that the connecting part 77 for connecting the upper surface part 71 and the lower surface part 72 is a cushioning part 79 to be elastically deformed in the form of substantially circular in cross section and the corner part 78 is omitted. Since the other parts are the same as those in the previous example, the same parts are denoted by the same reference numerals and hence, the description thereof is omitted.

Referring to FIGS. 1 and 43, when a bottom-side end part 22 in the frame of the solar battery module 16 constituting the solar battery module device 14 in the example shown in FIG. 1 is fixed to the lower frame 24 in the same manner as that in the previous example with the conductive fitting 68 mounted on a frame forming the end part 22, a claw part 73 projected upward in the thickness direction of a plate from the upper surface part 71 of the conductive fitting 68 is stuck in a fixing cover 27, and a claw part 74 projected downward is stuck in an upper surface of the frame forming the end part 22. Further, a claw part 75 projected downward in the thickness direction of the plate from the lower surface part 72 of the conductive fitting 68 is stuck in a placing surface 23, and a claw part 76 projected upward is stuck in a lower surface of the frame forming the end part 22. Therefore, between the solar battery module 16 and the lower frame 24 can be reliably ground-connected to each other.

In addition thereto, the cushioning part 79 is crushed by being sandwiched between the placing surface 23 of the lower frame 24 and the fixing cover 27 and is elastically deformed to produce a reaction force in this example, so that the solar battery module 16 can be more reliably mounted on the installing member 15 without producing backlash. The same applies to the upper frame 21.

Figure 44:
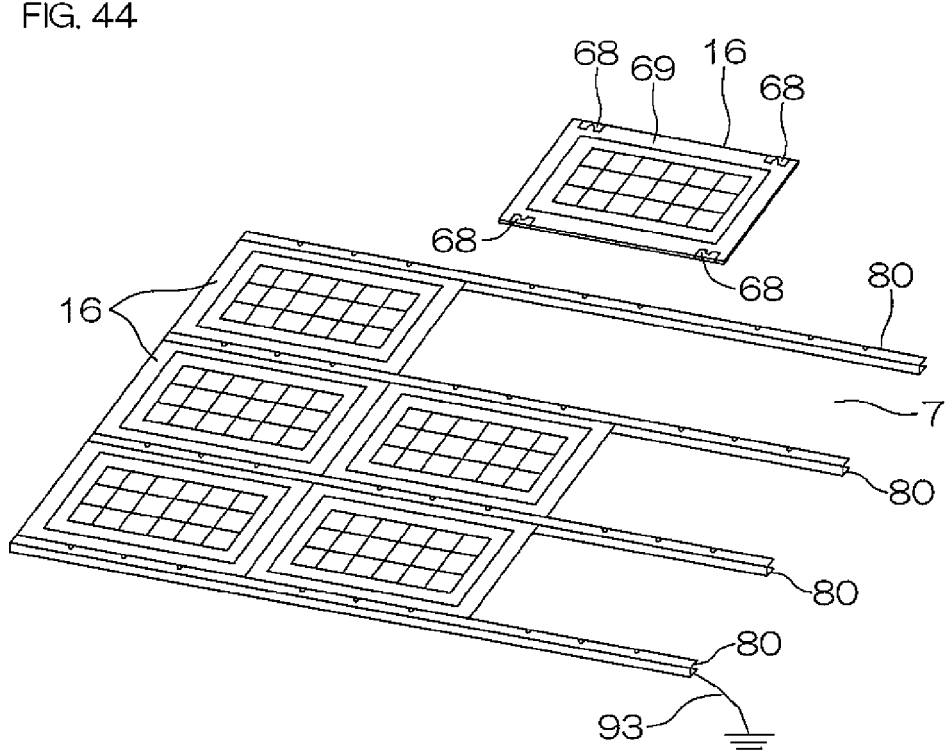
FIG. 44 is a perspective view showing one step in construction for constructing a photovoltaic power generating system of a roof-integration type by mounting a solar battery module on a transverse rail fixed on a roofer through the conductive fitting shown in FIG. 41 or 43.
Figure 45:
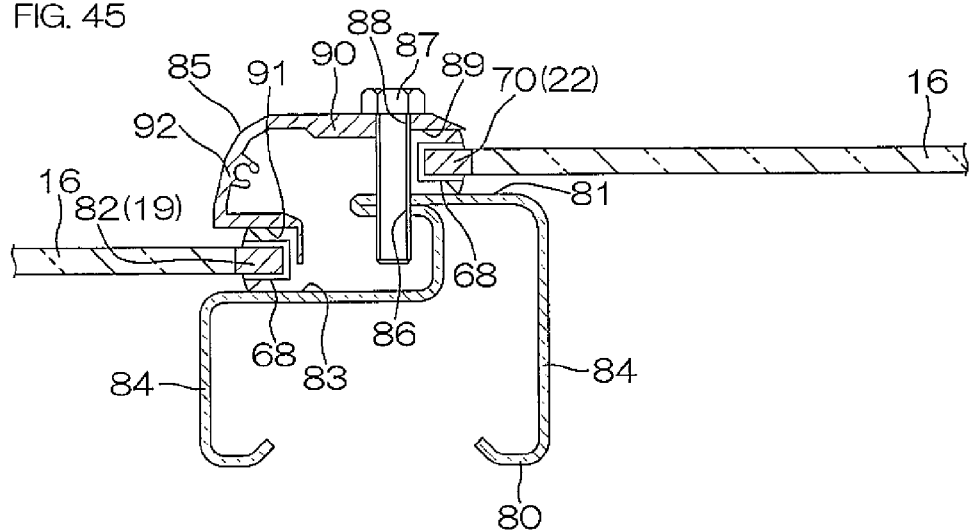
FIG. 45 is a cross-sectional view showing in enlarged fashion a state during the step in process of mounting a solar battery module on a transverse rail through the conductive fitting shown in FIG. 41.

The conductive fitting 68 shown in FIGS. 41 and 43 is not only limited to use for the solar battery module device 14 according to the present invention, but can be effectively utilized in mounting the solar battery module 16 on the roofer 7 by various mounting structures to construct a photovoltaic power generating system of a roof-integration type. For example, FIG. 44 is a perspective view showing one step in construction for constructing the roof-integration type photovoltaic power generating system by mounting the solar battery module 16 on a transverse rail 80 fixed on the roofer 7 through the conductive fitting 68 shown in FIG. 41 or 43. FIG. 45 is a cross-sectional view showing in enlarged fashion of a state during the step in process of mounting the solar battery module 16 on the transverse rail 80 through the conductive fitting 68 shown in FIG. 41.

Referring to FIG. 44, a plurality of transverse rails 80 are disposed on the roofer 7 in place of the conventional crosspieces 12. Each of the transverse rails 80 has the function of holding the lower side of the solar battery module 16 disposed on the upper side in the sloping direction of the roofer 7 (on the innermost side in FIG. 44) as well as holding the upper side of the solar battery module 16 disposed on the lower side in the sloping direction thereof (on the front side). The adjacent transverse rails 80 are equally spaced such that the rails can respectively hold the upper side and the lower side of the one solar battery module 16. Each of the transverse rails 80 is formed to have a length that is not less than an integral multiple of the length in a transverse direction perpendicular to the sloping direction of the roofer 7 of the solar battery module 16 such that a plurality of solar battery modules 16 can be held by a pair of adjacent transverse rails 80.

Referring to FIGS. 44 and 45, each of the transverse rails 80 is formed by subjecting a plate material to bending processing, and comprises a first placing surface 81 on which a frame 70 forming a bottom-side end part 22 in a frame 69 of the solar battery module 16 disposed on the upper side in the sloping direction of the roofer 7 (on the right side in FIG. 45) is placed, a second placing surface 83 disposed below the first placing surface 81 on which a frame 82 forming a top-side end part 19 in the frame 69 of the solar battery module 16 disposed on the lower side in the sloping direction thereof (on the left side) is placed, and a pair of leg parts 84 for mounting the transverse rail 80 on a surface of the roofer 7.

The solar battery module 16 is fixed to the transverse rail 80 by a fixing cover 85 detachably mounted on the transverse rail 80. Further, the fixing cover 85 is detachably mounted on the transverse rail 80 by a screw 87 meshed into a threaded hole 86 formed on the first placing surface 81 of the transverse rail 80. The fixing cover 85 has a through hole 88 through which the screw 87 is inserted, and comprises a main body 90 serving as a first pressing surface 89 having its upper-side lower surface in the sloping direction of the roofer 7 disposed opposite to the first placing surface 81, and an extended part 92 extended downward from an end, below the through hole 88 in the sloping direction of the main body 90 and having its tip whose lower surface is disposed opposite to the second placing surface 83. The fixing cover 85 is formed in a cross-sectional shape as illustrated by a processing method such as extrusion or drawing using a metal material having corrosion resistance such as an aluminum alloy.

Referring to FIGS. 41, 42, and 45, in order to fix the solar battery module 16 on the transverse rail 80, the bottom-side end part 22 of the solar battery module 16 disposed above the transverse rail 80 in the sloping direction is placed on the first placing surface 81 of the transverse rail 80 with the screw 87 loosened, for example, and the top-side end part 19 of the solar battery module 16 disposed below the transverse rail 80 in the sloping direction is placed on the second placing surface 83. The screw 87 is then tightened with the first pressing surface 89 of the fixing cover 85 applied on the end part 22 of the upper solar battery module 16 placed on the first placing surface 81 of the transverse rail 80 and the second pressing surface 91 applied on the end part 19 of the lower solar battery module 16 placed on the second placing surface 83.

Consequently, the bottom-side end part 22 of the upper solar battery module 16 is sandwiched between the first placing surface 81 and the first pressing surface 89, so that the claw parts 73 to 76 of the conductive fitting 68 mounted on the frame 70 forming the end part 22 are respectively stuck in the first pressing surface 89 of the fixing cover 85, the upper surface of the frame 70, the first placing surface 81 of the transverse rail 80, and the lower surface of the frame 70. Therefore, the upper solar battery module 16 and the transverse rail 80 are reliably ground-connected to each other, and the lower side of the upper solar battery module 16 is fixed to the transverse rail 80.

In addition thereto, the top-side end part 19 of the lower solar battery module 16 is sandwiched between the second placing surface 83 and the second pressing surface 91, so that the claw parts 73 to 76 of the conductive fitting 68 mounted on the frame 82 forming the end part 19 are respectively stuck in the second pressing surface 91 of the fixing cover 85, the upper surface of the frame 82, the second placing surface 83 of the transverse rail 80, and the lower surface of the frame 82. Therefore, the lower solar battery module 16 and the transverse rail 80 are reliably ground-connected to each other, and the upper side of the lower solar battery module 16 is fixed to the transverse rail 80. When this operation is repeated in order in the sloping direction of the roofer 7 and the transverse direction perpendicular to the sloping direction, the roof-integration type photovoltaic power generating system can be formed.

Referring to FIG. 44, in the formed photovoltaic power generating system, the transverse rails 80 and the solar battery modules 16 above and below the transverse rail 80 are reliably ground-connected to each other through the conductive fittings 68, as previously described. Therefore, ground wiring 93 may be only connected to the lowermost transverse rail 80, as illustrated, for example, the construction can be facilitated by simplifying wiring.

Figure 46:
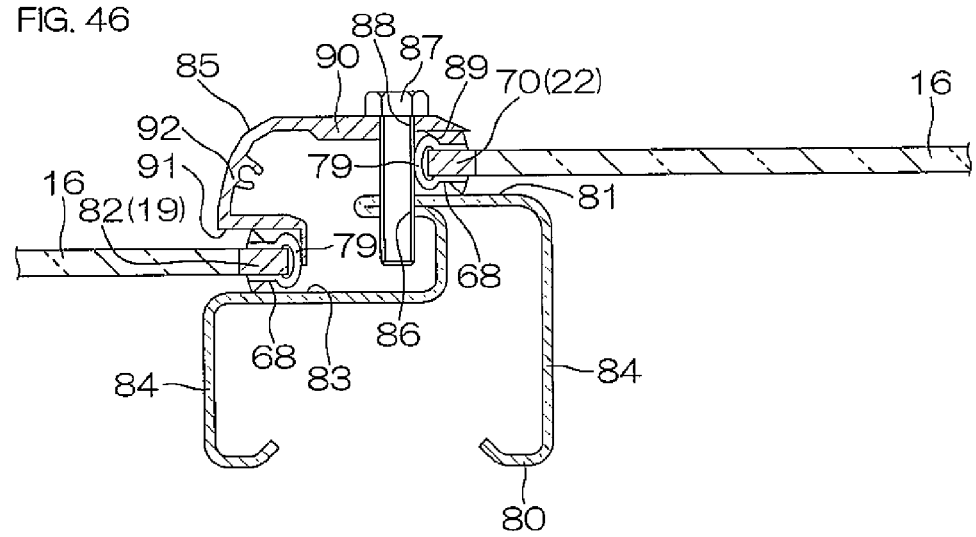
FIG. 46 is a cross-sectional view showing in enlarged fashion a state during the step in process of mounting a solar battery module on a transverse rail through the conductive fitting shown in FIG. 43.

FIG. 46 is a cross-sectional view showing in enlarged fashion a state during the step in process of mounting the solar battery module 16 on the transverse rail 80 through the conductive fitting 68 shown in FIG. 43. Referring to FIGS. 43 and 46, in a case where the conductive fitting 68 having the cushioning part 79 to be elastically deformed is employed, when the screw 87 is tightened, the bottom-side end part 22 of the upper solar battery module 16 is sandwiched between the first placing surface 81 and the first pressing surface 89, as in the case shown in FIG. 45, so that the claw parts 73 to 76 of the conductive fitting 68 mounted on the frame 70 forming the end part 22 are respectively stuck in the first pressing surface 89 of the fixing cover 85, the upper surface of the frame 70, the first placing surface 81 of the transverse rail 80, and the lower surface of the frame 70. Therefore, the upper solar battery module 16 and the transverse rail 80 are reliably ground-connected to each other. In addition thereto, the cushioning part 79 is crashed by being sandwiched between the first placing surface 81 and the first pressing surface 89 and is elastically deformed to produce a reaction force, which allows the lower side of the solar battery module 16 to be more reliably fixed to the transverse rail 80 without producing backlash.

As in the case shown in FIG. 45, the top-side end part 19 of the lower solar battery module 16 is sandwiched between the second placing surface 83 and the second pressing surface 91, so that the claw parts 73 to 76 of the conductive fitting 68 mounted on the frame 82 forming the end part 19 are respectively stuck in the second pressing surface 91 of the fixing cover 85, the upper surface of the frame 82, the second placing surface 83 of the transverse rail 80, and the lower surface of the frame 82. Therefore, the lower solar battery module 16 and the transverse rail 80 are reliably ground-connected to each other. In addition thereto, the cushioning part 79 is crashed by being sandwiched between the second mounting surface 83 and the second pressing surface 91 and is elastically deformed to produce a reaction force, which allows the upper side of the solar battery module 16 to be more reliably fixed to the transverse rail 80 without producing backlash.

Figure 47:
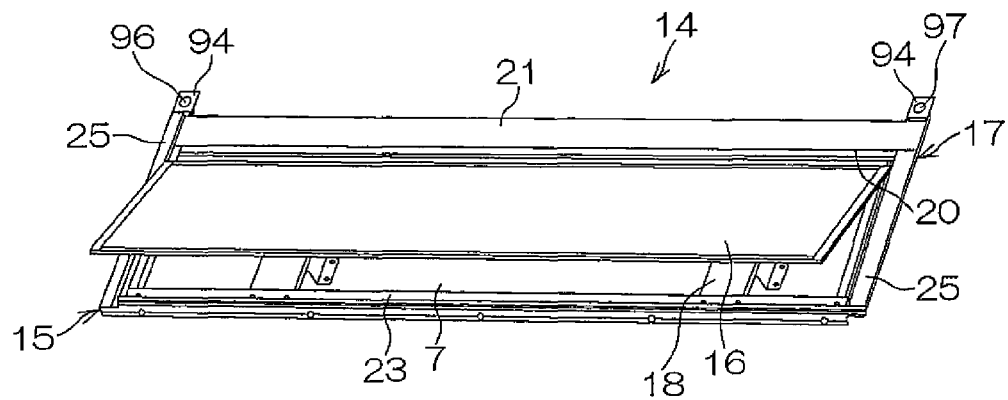
FIG. 47 is a perspective view showing another example of the embodiment of the solar battery module device according to the present invention.
Figure 48:
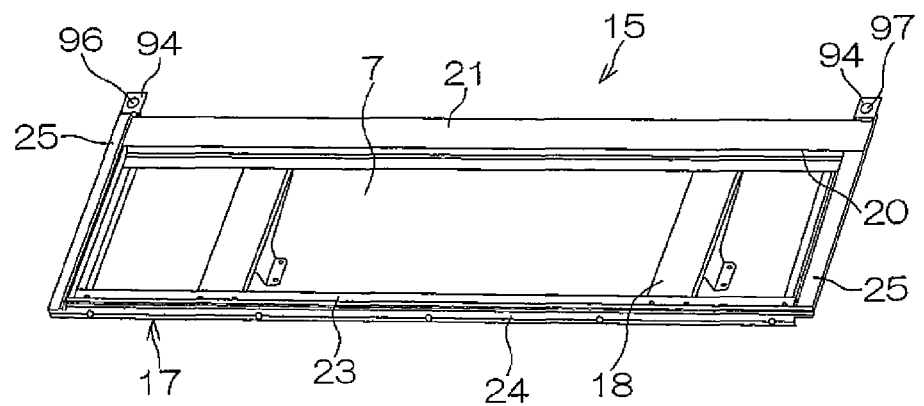
FIG. 48 is a perspective view of an installing member in the solar battery module device shown in FIG. 47.
Figure 49:
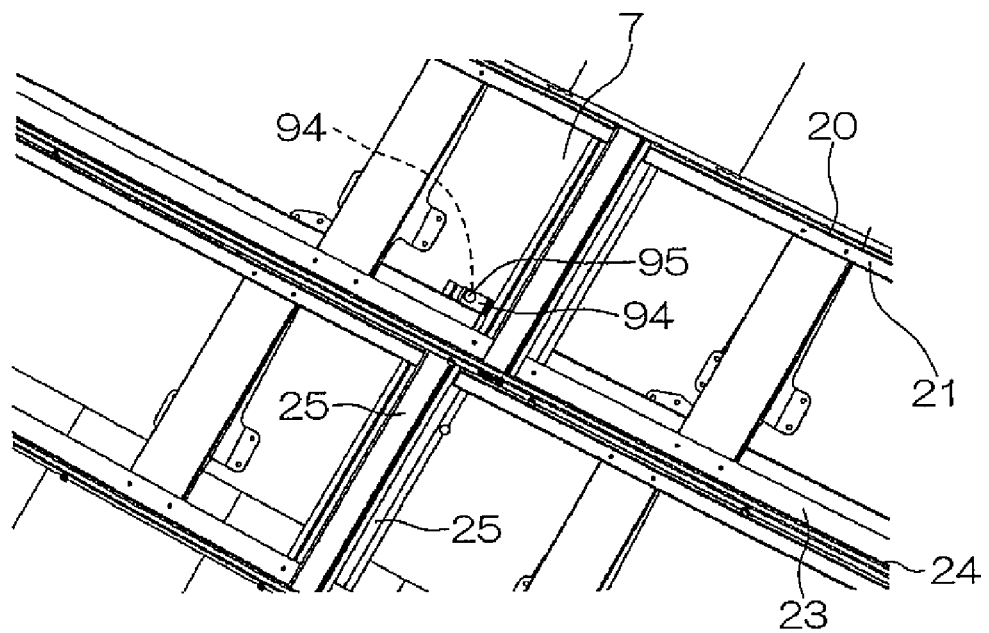
FIG. 49 is a perspective view showing a state where a plurality of installing members shown in FIG. 48 are fixed on a roofer.
Figure 50:
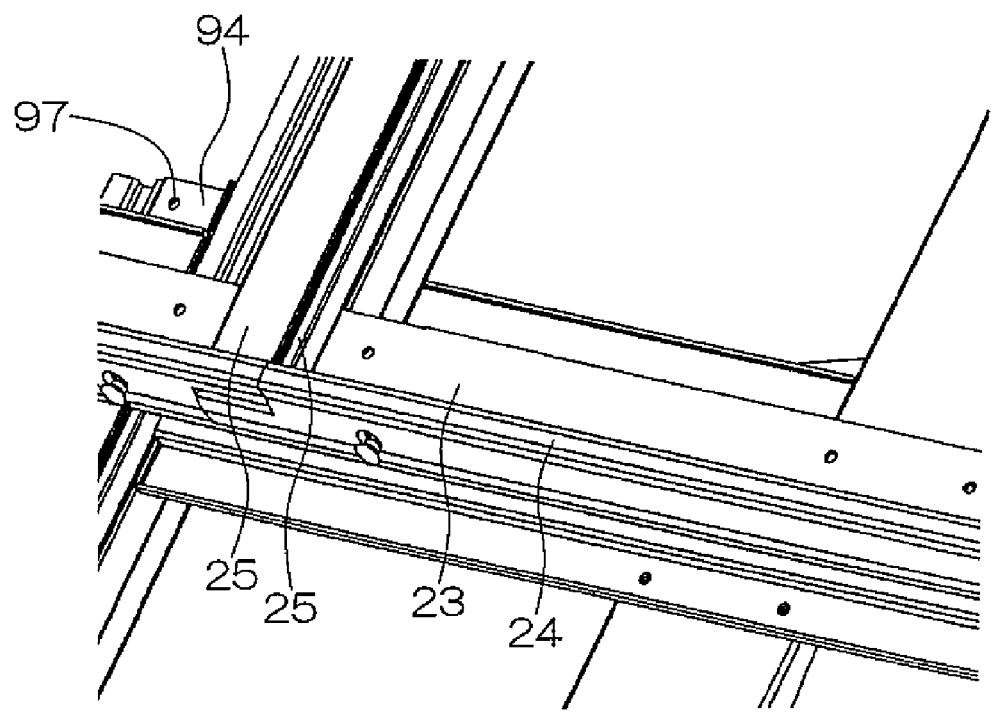
FIG. 50 is a perspective view showing a part of FIG. 49 in enlarged fashion.

FIG. 47 is a perspective view showing another example of the embodiment of the solar battery module device 14 according to the present invention. FIG. 48 is a perspective view of an installing member 15 in the solar battery module device 14 shown in FIG. 47. FIG. 49 is a perspective view showing a state where a plurality of installing members 15 shown in FIG. 48 are fixed on a roofer 7. FIG. 50 is a perspective view showing a part of FIG. 49 in enlarged fashion. Referring to the figures, the solar battery module device 14 in this example differs from that in each of the examples shown in the previous figures in that the installing member 15 comprises right and left side frames 25 respectively holding the right and left sides of a rectangular shape of a solar battery module 16, and both the side frames 25 are respectively formed in such shapes that when the plurality of installing members 15 are arranged in a transverse direction perpendicular to the sloping direction of the roofer 7 (in the right-and-left direction in each of the figures), the right side frame 25 of the left installing member 15 and the left side frame 25 of the right installing member 15 are overlapped with each other.

Furthermore, the solar battery module device 14 in this example also differs from that in each of the examples shown in the previous figures in that the insulating members 15 are respectively provided with protruding parts 94 that are overlapped with and conductively connected to each other when they are arranged in the transverse direction with both the frames 25 overlapped therewith. Since the other parts are the same as those in the examples shown in the previous figures, in particular the example shown in FIG. 1, the same parts are denoted by the same reference numerals and hence, the description thereof is omitted.

Referring to each of the figures, the right and left side frames 25 are respectively formed to have thicknesses that are one-half those of the upper frame 21 and the lower frame 24, and the left side frame 25 is disposed offset downward from the frame 17 and the right side frame 25 is disposed offset upward from the frame 17 in each of the figures. In a case where the installing members 15 are arranged in the transverse direction, therefore, the right side frame 25 of the left installing member 15 and the left side frame 25 of the right installing member 15 can be overlapped with each other.

Furthermore, a pair of protruding parts 94 is provided by protruding the side frames 25 from both right and left ends at an end part on the upper side in the sloping direction of the roofer 7 (on the innermost side in each of the figures) of the upper frame 21 upward in the sloping direction. The protruding parts 94 are respectively formed by extending the side frames 25, as described above, so that they are respectively formed to have thicknesses that are one-half the thicknesses of the upper frame 21 and the lower frame 24, similarly to the side frames 25, and the left protruding part 94 is disposed offset downward and the right protruding part 94 is disposed offset upward from the frame 17 in each of the figures. Therefore, they can be overlapped with each other in the vertical direction by arranging the installing members 15 with the side frames 25 overlapped with each other in the vertical direction in the transverse direction perpendicular to the sloping direction of the roofer 7, as previously described.

In order to conductively connect the protruding parts 94 overlapped with each other in the vertical direction, a screw 95 is used. That is, a threaded hole 96 into which the screw 95 is screwed is formed in the left protruding part 94 in each of the figures that is the lower protruding part in the case of overlapping, and a through hole 97 through which the screw 95 is inserted is formed in the right protruding part 94 that is the upper protruding part. Therefore, the upper and lower protruding parts 94 can be made to conductively connected with contact each other by inserting the screw 95 into the through hole 97 in the upper protruding part 94 to screw the screw 95 into the threaded hole 96 in the lower protruding part 94 and tighten the screw 95. Therefore, wiring operations can be simplified by omitting wiring for ground connection over a plurality of solar battery module devices 14.

Figure 51:
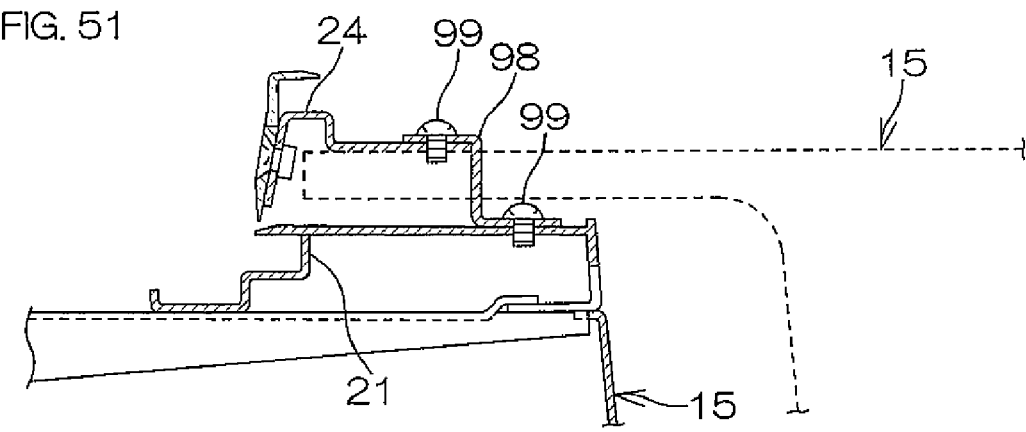
FIG. 51 is a cross-sectional view showing an example of a configuration in which installing members fixed on the upper and lower sides in the sloping direction of a roofer are ground-connected to each other.

FIG. 51 is a cross-sectional view showing an example of a configuration in which installing members 15 fixed on the upper and lower sides in the sloping direction of a roofer 7 are ground-connected to each other. Referring to FIG. 51, both ends of a fitting 98 for conductive connection are respectively fixed with screws 99 to a lower frame 24 of the installing member 15 fixed on the upper side in the sloping direction of the roofer 7 (on the right side in the figure) and an upper frame 21 in the installing member 15 fixed on the lower side in the sloping direction thereof (on the left side), to ground-connect the upper and lower installing members 15 by the fitting 98. Therefore, wiring operations can be further simplified by further omitting wiring for ground connection over a plurality of solar battery module devices 14.

Figure 52:
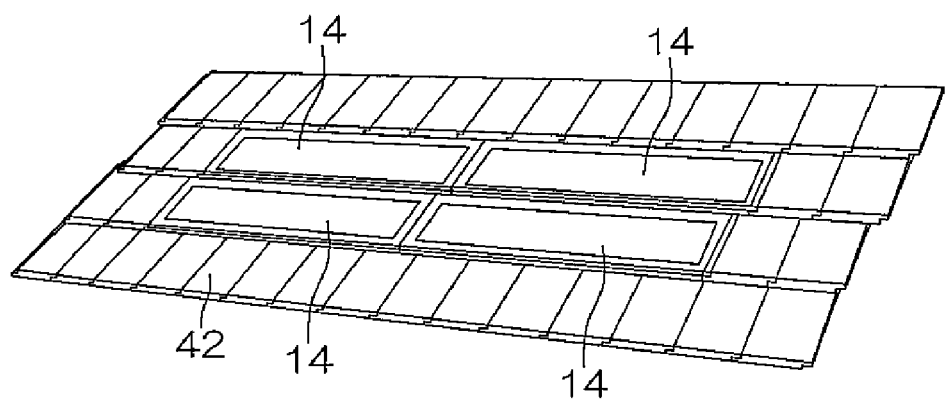
FIG. 52 is a perspective view showing the appearance of a photovoltaic power generating system of a roof-integration type whose installation is completed.
Figure 53:
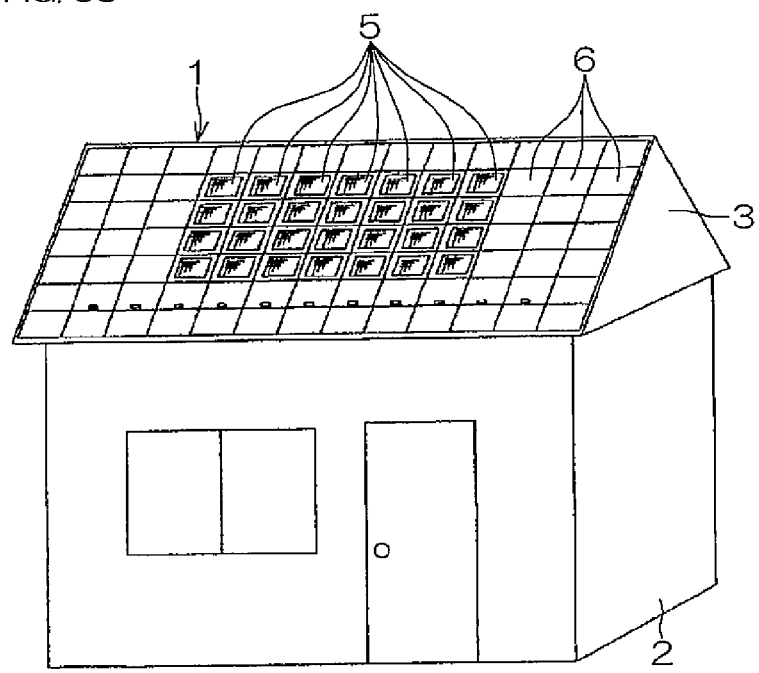
FIG. 53 is a perspective view showing a state where a conventional photovoltaic power generating system of a roof-integration type is installed on a roof of a general housing.
Figure 54:
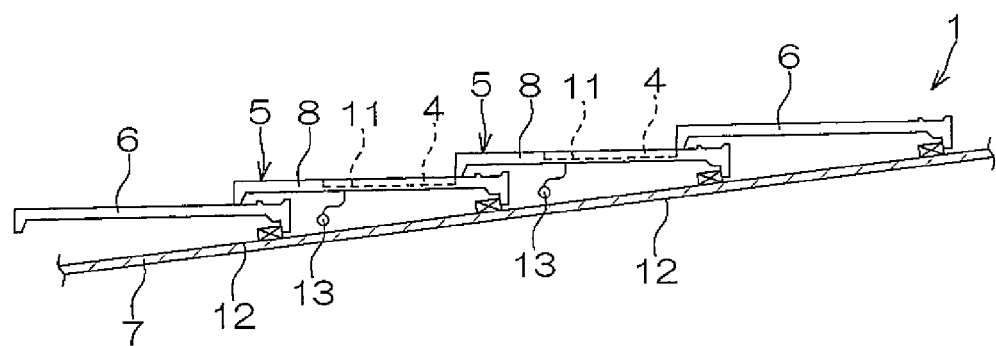
FIG. 54 is a cross-sectional view showing a state where a roofer of a roof is thatched with a roofing material serving as a solar battery module incorporating a solar battery constituting the photovoltaic power generating system shown in FIG. 53 and a general roofing material.
Figure 55:
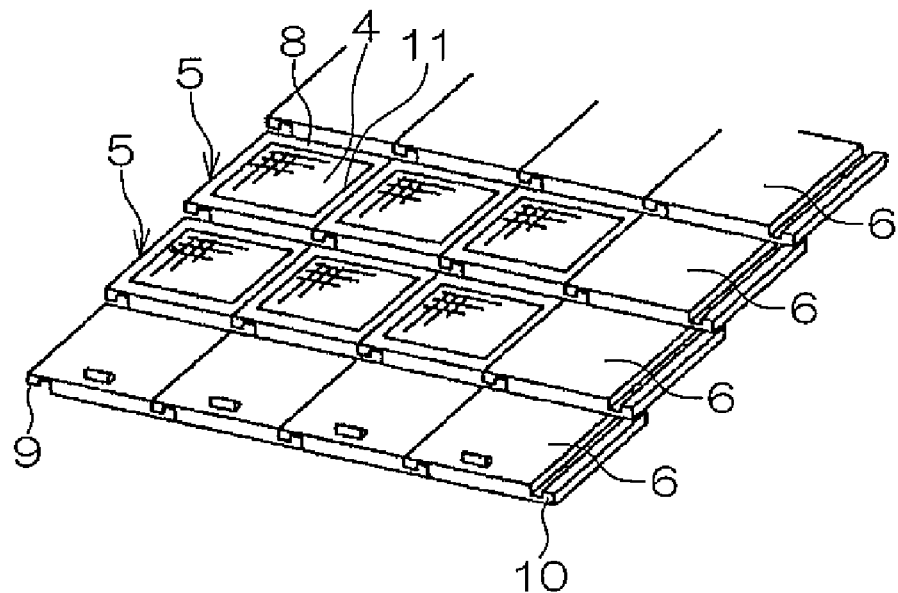
FIG. 55 is a perspective view showing an example of the shape of a roofing material constituting the photovoltaic power generating system shown in FIG. 53.
Figure 56:
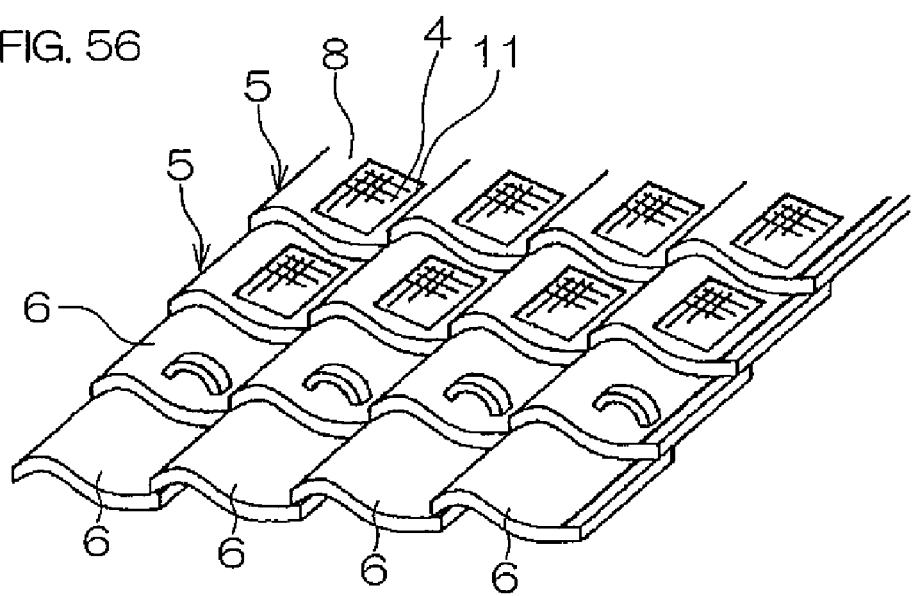
FIG. 56 is a perspective view showing a modified example of the roofing material.

FIG. 52 is a perspective view showing the appearance of a photovoltaic power generating system of a roof-integration type whose installation is completed. The figure shows a case where solar battery module devices 14 together with roofing materials 42 having a cross-sectional shape similar to that of the solar battery module devices 14 are installed on a roofer 7 to construct the roof-integration type photovoltaic power generating system. The plane shape of the solar battery module device 14 defined by the external shape of a frame 17 is formed such that two solar battery module devices 14 are substantially equal in shape and size to eleven roofing materials 42. Therefore, the completed photovoltaic power generating system has a superior appearance in which the roofing materials 42 and the solar battery module devices 14 are harmonized with each other.

The configuration of the solar battery module device according to the present invention is not limited to that in each of the examples shown in the figures described above. Various design changes can be made without departing from the scope of the present invention.

The invention claimed is:

1. A solar battery module device, comprising:
a rectangular plate-shaped solar battery module; and
an installing member for installing the solar battery module on a sloping roof, wherein the installing member comprises:
an upper frame having an engagement part in which a top-side end of the rectangular plate-shaped solar battery module contacts the upper frame;
a lower frame disposed below the upper frame in the sloping direction of the roof and having a placing surface on which a bottom-side end of the rectangular plate-shaped solar battery module is placed, with the top-side end in the engagement part of the upper frame; and
a fixing cover detachably mounted on the lower frame for fixing the bottom-side end on the placing surface, wherein the bottom-side end is opposite the top-side end;
wherein the lower frame comprises a plate-shaped extended part extending in a downward direction from the rectangular plate-shaped solar battery modules,
wherein the fixing cover comprises a plate-shaped mounting part overlapped with the extended part and mounted, and
wherein both the extended part and the mounting part are inclined to a surface of the solar battery module.

2. The solar battery module device according to claim 1, wherein
the fixing cover has a fixing part abutted against an upper surface and a side end surface of the solar battery module for fixing the solar battery module to the lower frame with the mounting part mounted on the extended part.

3. The solar battery module device according to claim 2, wherein a projection abutted against the end surface of the bottom-side end of the solar battery module is formed on the fixing part.

4. The solar battery module device according to claim 3, wherein the projection has a slant with the end surface of the bottom-side end of the solar battery module.

5. The solar battery module device according to claim 1, wherein a projection abutted against an end surface of the top-side end fitted in the engagement part of the upper frame of the solar battery module is formed on the engagement part.

6. The solar battery module device according to claim 5, wherein the projection has a slant with the end surface of the top-side end of the solar battery module.

7. The solar battery module device according to claim 1, wherein the engagement part of the upper frame has
a supporting part abutted against a lower surface of the solar battery module for supporting the top-side end from below,
a pressing part located above the supporting part in the sloping direction of the roof and abutted against an upper surface of the top-side end supported from below by the supporting part, and
a groove part located at a position above the supporting part in the sloping direction of the roof and opposite to the pressing part and recessed toward the roof compared with the supporting part.

8. The solar battery module device according to claim 1, wherein at least one of the top-side end and the bottom-side end of the solar battery module is mounted on at least one of the upper frame and the lower frame through a conductive fitting integrally formed of a plate material having a plate-shaped upper surface part abutted against the upper surface of the bottom-side end, a plate-shaped lower surface part abutted against the lower surface of the bottom-side end, claw parts respectively extending upward and downward in the thickness direction of a plate from both the upper and lower surface parts, and a connecting part for connecting the upper surface part and the lower surface part.

9. The solar battery module device according to claim 8, wherein the connecting part is a cushioning part elastically deformable.

* * * * *